(12) United States Patent
Barbano et al.

(10) Patent No.: US 10,906,390 B2
(45) Date of Patent: Feb. 2, 2021

(54) TANK COMPONENT, IN PARTICULAR FOR EXHAUST-GAS TREATMENT SYSTEM OF INTERNAL-COMBUSTION ENGINES

(71) Applicant: ELTEK S.p.A., Casale Monferrato (IT)

(72) Inventors: Alberto Barbano, Casale Monferrato (IT); Marco Bizzarro, Casale Monferrato (IT); Mauro Zorzetto, Casale Monferrato (IT); Costanzo Gadini, Casale Monferrato (IT); Marco Pizzi, Casale Monferrato (IT); Piercarlo Merlano, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 288 days.

(21) Appl. No.: 15/773,384

(22) PCT Filed: Oct. 31, 2016

(86) PCT No.: PCT/IB2016/056559
§ 371 (c)(1),
(2) Date: May 3, 2018

(87) PCT Pub. No.: WO2017/077448
PCT Pub. Date: May 11, 2017

(65) Prior Publication Data
US 2018/0319271 A1 Nov. 8, 2018

(30) Foreign Application Priority Data
Nov. 6, 2015 (IT) .................. 102015000070073

(51) Int. Cl.
*B60K 15/03* (2006.01)
*F01N 3/20* (2006.01)
*F01N 3/24* (2006.01)

(52) U.S. Cl.
CPC ........ *B60K 15/03177* (2013.01); *F01N 3/208* (2013.01); *F01N 3/2066* (2013.01);
(Continued)

(58) Field of Classification Search
CPC .... B60K 15/03177; B60K 2015/03348; B60K 2015/0319; B60K 2015/03243;
(Continued)

(56) References Cited

U.S. PATENT DOCUMENTS 5,219,422 A * 6/1993 Sato .................. B60S 1/481
222/282
5,628,186 A * 5/1997 Schmelz ............ B01D 53/30
60/274

(Continued)

FOREIGN PATENT DOCUMENTS

WO 2007/141312 12/2007
WO 2013/178307 12/2013

OTHER PUBLICATIONS

International Search Report and Written Opinion of the ISA for PCT/IB2016/056559 dated Mar. 7, 2017, 14 pages.

*Primary Examiner* — Ernesto A Grano
(74) *Attorney, Agent, or Firm* — Nixon & Vanderhye P.C.

(57) ABSTRACT

Component of tank of liquid additive of system for treating exhaust gases of internal combustion engine, has body positioned in fluid-tight way at opening of the tank and incorporates plurality of functional devices for managing liquid additive to be delivered to treatment system. Body of tank component is moulded using plastic material chemically resistant to liquid additive and is provided with at least one passageway for liquid additive. The plurality of functional devices comprises pump and pressure sensor having pressure-sensitive element. Passageway comprises delivery path for the liquid additive, which is defined at least in part in first wall of body of tank component and has inlet end (Continued)

configured for connection to delivery duct of the pump. Defined at outer side of first wall is at least one seat for positioning at least one part of pressure sensor. Moreover defined in the first wall is at least one passage for setting delivery path for liquid additive in fluid communication with sensitive element of pressure sensor.

17 Claims, 22 Drawing Sheets

(52) U.S. Cl.
CPC ........ *F01N 3/24* (2013.01); *B60K 2015/0319* (2013.01); *B60K 2015/0321* (2013.01); *B60K 2015/03243* (2013.01); *B60K 2015/03348* (2013.01); *B60K 2015/03427* (2013.01); *F01N 2560/08* (2013.01); *F01N 2570/14* (2013.01); *F01N 2610/02* (2013.01); *F01N 2610/10* (2013.01); *F01N 2610/1406* (2013.01); *F01N 2610/148* (2013.01); *F01N 2610/1413* (2013.01); *F01N 2610/1433* (2013.01); *F01N 2610/1446* (2013.01); *Y02A 50/20* (2018.01); *Y02T 10/12* (2013.01)

(58) Field of Classification Search
CPC ........... B60K 2015/0321; F01N 3/2066; F01N 2610/1406; F01N 2610/148; F01N 2610/1446; F01N 2610/1433; F01N 2610/1413; F01N 2610/10; F01N 2610/02; F01N 2560/08
USPC ........................................................ 220/562
See application file for complete search history.

(56) References Cited

U.S. PATENT DOCUMENTS

| | | | | |
|---|---|---|---|---|
| 5,884,475 | A * | 3/1999 | Hofmann | B01D 53/9431 60/274 |
| 5,887,617 | A * | 3/1999 | Frank | B60K 15/077 137/574 |
| 5,988,213 | A * | 11/1999 | Yoshioka | F02M 37/106 123/509 |
| 6,063,350 | A * | 5/2000 | Tarabulski | B01D 53/90 423/239.1 |
| 6,065,452 | A * | 5/2000 | Yoshioka | B60K 15/077 123/509 |
| 6,283,731 | B1 * | 9/2001 | Yoshioka | B01D 35/0273 417/423.3 |
| 6,332,555 | B1 * | 12/2001 | Stangier | B60K 15/03177 220/319 |
| 6,442,932 | B1 * | 9/2002 | Hofmann | B01D 53/9431 60/274 |
| 6,513,323 | B1 * | 2/2003 | Weigl | B01D 53/9431 60/286 |
| 7,849,674 | B2 * | 12/2010 | Masuda | B01D 53/9409 60/286 |
| 8,850,797 | B2 * | 10/2014 | Dougnier | F01N 3/2066 60/286 |
| 9,399,941 | B2 * | 7/2016 | Groh | F01N 3/2066 |
| 9,476,336 | B2 * | 10/2016 | Brueck | F01N 3/2066 |
| 9,726,399 | B2 * | 8/2017 | Verstraeten | F01N 3/2066 |
| 9,765,665 | B2 * | 9/2017 | Hodgson | F01N 3/2066 |
| 9,840,958 | B2 * | 12/2017 | Maus | F01N 3/2066 |
| 10,245,534 | B2 * | 4/2019 | Koonce | B01D 35/005 |
| 2002/0081239 | A1 * | 6/2002 | Palesch | F01N 3/2066 422/168 |
| 2003/0033799 | A1 * | 2/2003 | Scheying | F01N 3/2066 60/286 |
| 2003/0101715 | A1 * | 6/2003 | Huthwohl | F01N 3/2066 60/286 |
| 2004/0103652 | A1 * | 6/2004 | Schaller | B01D 53/9431 60/286 |
| 2005/0284871 | A1 * | 12/2005 | Leonard | B65D 39/086 220/562 |
| 2006/0051276 | A1 * | 3/2006 | Schaller | F01N 3/208 423/235 |
| 2013/0313137 | A1 * | 11/2013 | Madoux | F01N 3/00 206/216 |
| 2015/0075141 | A1 | 3/2015 | Brueck et al. | |
| 2015/0122041 | A1 * | 5/2015 | Lin | B81B 7/0054 73/724 |
| 2016/0290883 | A1 * | 10/2016 | Schumm | H01L 29/84 |
| 2017/0350778 | A1 * | 12/2017 | Gadini | G01L 19/143 |

* cited by examiner

Fig. 21
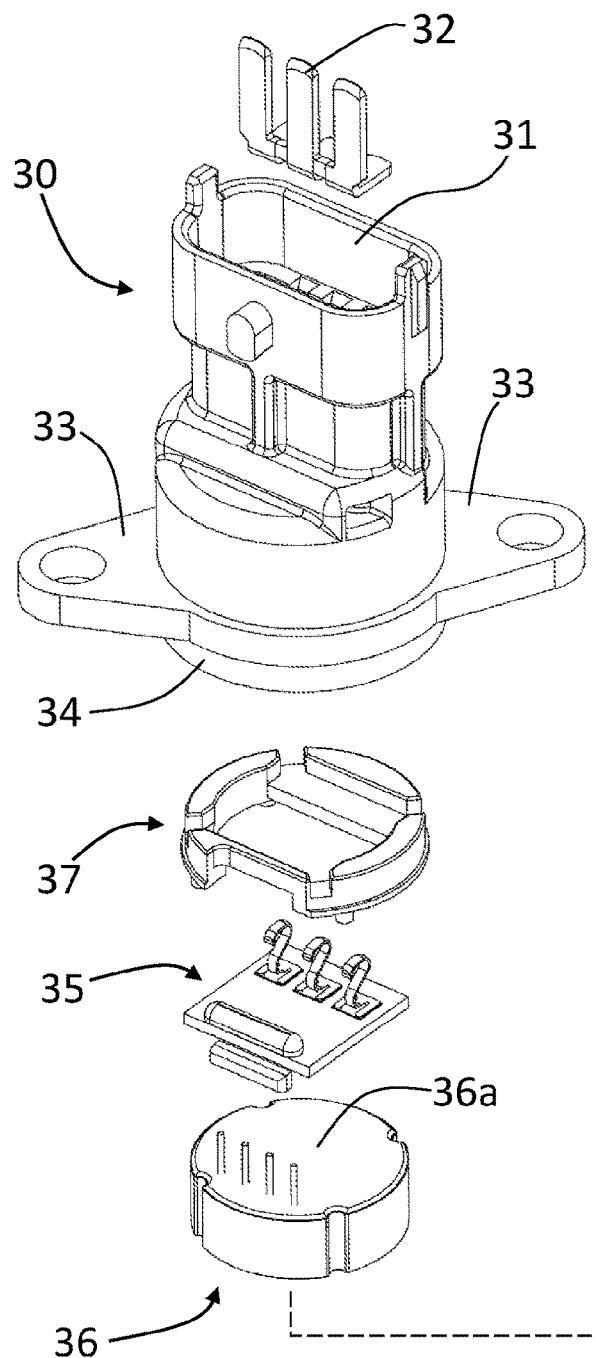
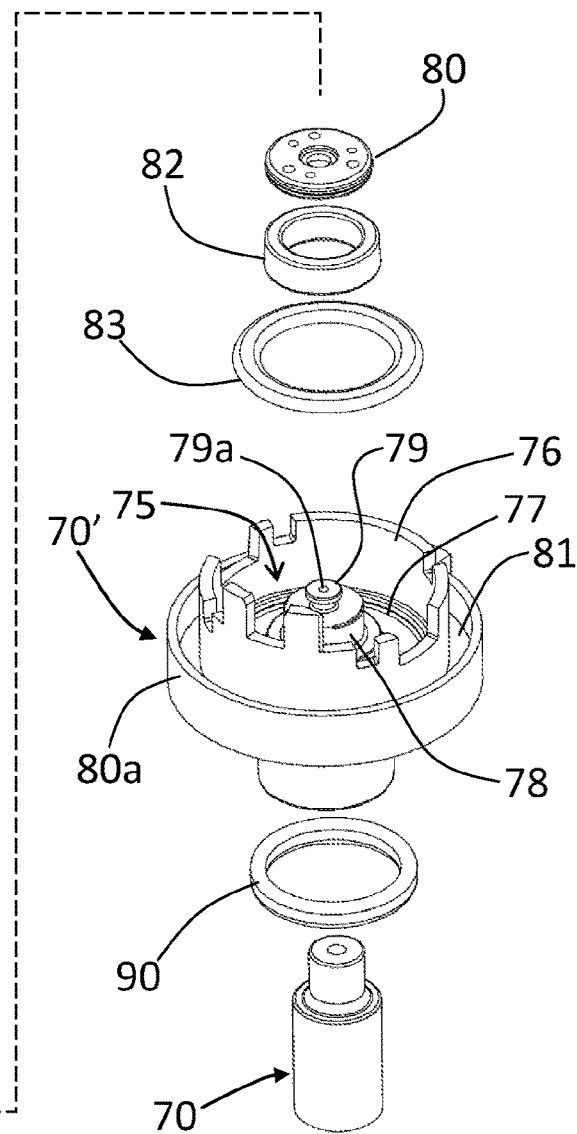
Fig. 22

US 10,906,390 B2

TANK COMPONENT, IN PARTICULAR FOR EXHAUST-GAS TREATMENT SYSTEM OF INTERNAL-COMBUSTION ENGINES

This application is the U.S. national phase of International Application No. PCT/IB2016/056559 filed Oct. 31, 2016 which designated the U.S. and claims priority to IT Patent Application No. 102015000070073 filed Nov. 6, 2015, the entire contents of each of which are hereby incorporated by reference.

FIELD OF THE INVENTION

The present invention relates to tanks for liquid substances and has been developed with particular reference to tanks for vehicles, preferably ones that are to contain a liquid, such as a liquid additive or a reducing agent, in particular of the type necessary for operation of a system for treatment of exhaust gases of an internal-combustion engine.

PRIOR ART

Systems for emission of exhaust gases of some types of vehicles must be devised for the purposes of reducing emission of nitrogen oxides ($NO_x$) into the atmosphere. A particularly widespread system having this purpose is based upon the process known as SCR (Selective Catalytic Reduction), which enables reduction of the nitrogen oxides of the gases by means of injection of a reducing agent into the exhaust line. These treatment systems presuppose that the reducing agent is dosed and injected into the flow of the exhaust gases in order to convert nitrogen oxide ($NO_x$) into nitrogen ($N_2$) and water ($H_2O$). For this purpose, the vehicle is equipped with a tank containing the reducing agent, associated to which are suitable means for providing dosed injection of the agent itself into the SCR system. The reducing agent is typically constituted by urea in aqueous solution.

Associated to the tank are, in general, various functional devices, used for managing the urea solution and enabling injection thereof into the flow of gas upstream of the SCR catalytic converter. These devices comprise, for example, a pump and sensor means for detecting one or more characteristics of the fluid, for example, the level, temperature, pressure, and quality. Furthermore, given that the urea solution is liable to freeze when the tank is exposed to low temperatures (indicatively, temperatures lower than −11° C.), the tank itself is frequently equipped with a heating device so that, in the case of freezing, the liquid agent can be liquefied and then injected into the exhaust line.

In some known solutions, one or more of the aforesaid functional devices are associated to a component of the tank, known as UDM (Urea-Delivery Module), which is mounted in a fluid-tight way at an opening of the tank itself (see, for example, WO 2008/138960 A).

Components of this type typically include a passageway for drawing off the reducing agent from the tank, to this passageway there being generally connected the intake of the pump for drawing off the agent from the tank. The pump forces the reducing agent into an external pipe, connected to the delivery outlet of the pump itself.

Part of the reducing agent can accumulate in one or more of the above passageways, even in contact with or in positions relatively close to delicate or critical parts of one of the aforementioned sensors, such as an element thereof sensitive to the characteristic of interest, or of the pump. In conditions of low ambient temperature, when the heater is not active, the liquid accumulated may freeze, and hence increase in volume. This increase in volume may cause mechanical stresses on the aforesaid delicate or critical parts, such as the passageways or parts of the body of the component and/or of the sensors, with the risk of causing failure thereof or damage thereto.

In addition to this drawback, the tank components of the type referred to usually entail complications in installation of the aforesaid functional devices, and in particular of sensor means thereof.

OBJECT AND SUMMARY OF THE INVENTION

In its general terms, the present invention aims to provide a tank component of the type referred to above, that has a simple and inexpensive structure, but is reliable from the operating standpoint, and in which installation of one or more of the corresponding functional devices is easy and fast.

Another aim of the present invention is to provide such a tank component that enables reduction of the aforesaid risks linked to possible pressure jumps and/or to possible freezing of residue of the reducing agent at, or in the proximity of, delicate parts of functional devices associated to the component and/or of the component itself.

One or more of the above aims, as well as others that will emerge more clearly hereinafter, are achieved according to the present invention by a tank component having the characteristics referred to in the annexed claims. The claims form an integral part of the technical teaching provided herein in relation to the invention.

Likewise forming a subject of the invention is a tank comprising such a tank component and a system for treating the exhaust gases of an internal-combustion engine comprising such a tank and/or such a tank component.

BRIEF DESCRIPTION OF THE DRAWINGS

The characteristics and advantages of the present invention will emerge clearly from the ensuing detailed description, with reference to the annexed drawings, which are provided purely by way of non-limiting example and in which:

FIG. 21 is an exploded schematic view of a pressure sensor that can be used in the tank component of FIG. 20;

FIG. 22 is an exploded schematic view of a compensation insert that can be used in the tank component of FIG. 20;

DESCRIPTION OF PREFERRED EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", or the like that may be present in various points of this description do not necessarily refer to one and the same embodiment. Furthermore, particular conformations, structures, or characteristics defined in the framework of the present description may be combined in any adequate way in one or more embodiments, even different from the ones represented. The reference numbers and spatial references (such as "upper", "lower", "top", "bottom", etc.) used herein are provided merely for convenience and hence do not define the sphere of protection or the scope of the embodiments. It is moreover pointed out that, in the present description and in the attached claims, the term "inner side"—when referred to a bottom wall of the tank component described herein—is meant to indicate the side of the wall facing the inside of a tank, whereas the term "outer side" is meant to indicate the opposite side of the above wall, i.e., the side that is on the outside of the tank.

Figure 1A:
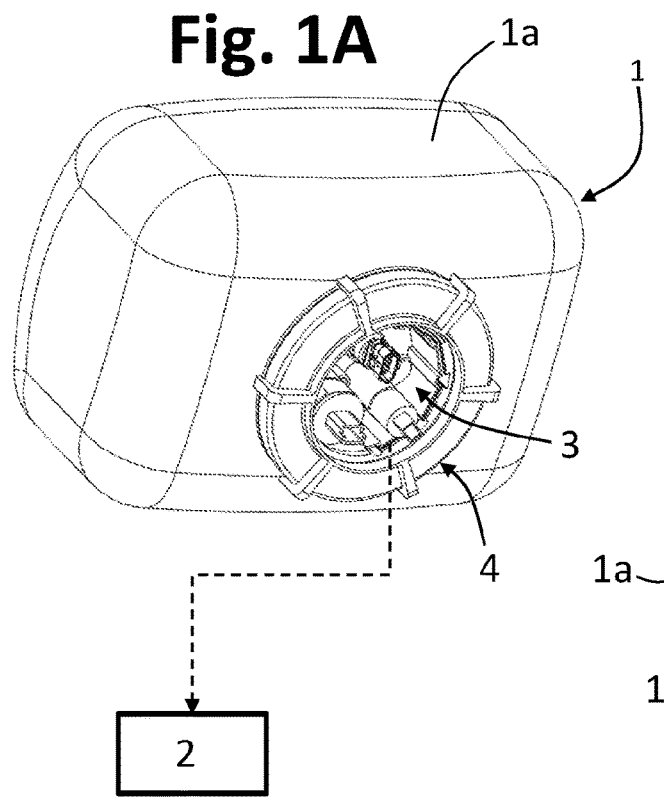
FIGS. 1A and 1B are a schematic perspective view and a sectioned perspective view, respectively, of a tank that comprises a component according to one embodiment of the invention.

With initial reference to FIG. 1A, designated as a whole by 1 is a tank for vehicles. In what follows, it is assumed that this tank is to contain an additive, or reducing agent, and forms part of a system for treatment of the exhaust gases of an internal-combustion engine, represented schematically by the block 2. In various embodiments, the treatment system 2 is of an SCR type, as explained in the introductory part of the present description, used for abatement of the emissions of nitrogen oxides, in particular in motor vehicles with diesel engines of a cubic capacity higher than 3500 cc. The aforesaid reducing agent may hence be urea in solution of distilled water, such as the one commercially known by the name AdBlue™. The tank 1 could, however, be used for other purposes and/or in sectors different from the automotive sector, and may contain a different liquid (the following definitions referred to an additive or a reducing agent can hence be understood as referring to a different liquid, for example, a fuel).

The main body 1a of the tank 1 may be made of any material, preferably a material that is chemically resistant to the reducing agent, for example, metal or a suitable plastic material, according to the known art, such as a high-density polyethylene (HDPE). Preferentially, the body 5 of the tank component 3 is made of a single moulded piece, but in other possible embodiments the body 5 is made up of at least two parts assembled together, preferably in a fluid-tight way, such as a bottom part and a peripheral part, not necessarily made of the same material.

Figure 1B:
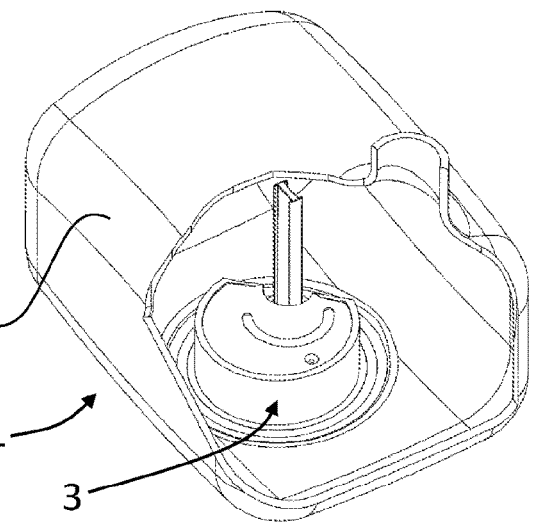

As may be seen also in FIG. 1B, the body 1a of the tank has an opening (not indicated), at which a tank component 3 according to an embodiment of the invention in mounted in a fluid-tight way. In the example, the aforesaid opening is provided in a lower part of the tank 1, but this position must not understood as essential, it being also possible for it to be provided in the upper part of the tank or in some other part. In various preferred embodiments, such as the ones represented herein, the component 3 has a body shaped for enabling fixing thereof in a fluid-tight way, i.e., for occluding the aforesaid lower opening of the tank 1. The body may be fixed in a fluid-tight way at the aforesaid opening according to modalities in themselves known: for instance, with reference to the example illustrated, the body of the component 3 is preferably mounted in a removable way via an engagement system including a corresponding fixing ring nut 4, it being possible, however, for it to be fixed in some other way, such as by welding or threaded means.

The component 3 according to the invention incorporates at least one functional device, which is active for management the reducing agent to be delivered to the system 2, in particular for the purposes of its storage and injection into the system 2.

For this purpose, the body of the component 3, designated by 5 also in FIGS. 2-5, defines at least one passageway for the reducing agent. In various embodiments of the invention, such a passageway hydraulically connects together at least two functional devices of the component (such as a pump and a pressure sensor, as in embodiments described hereinafter).

Figure 2:
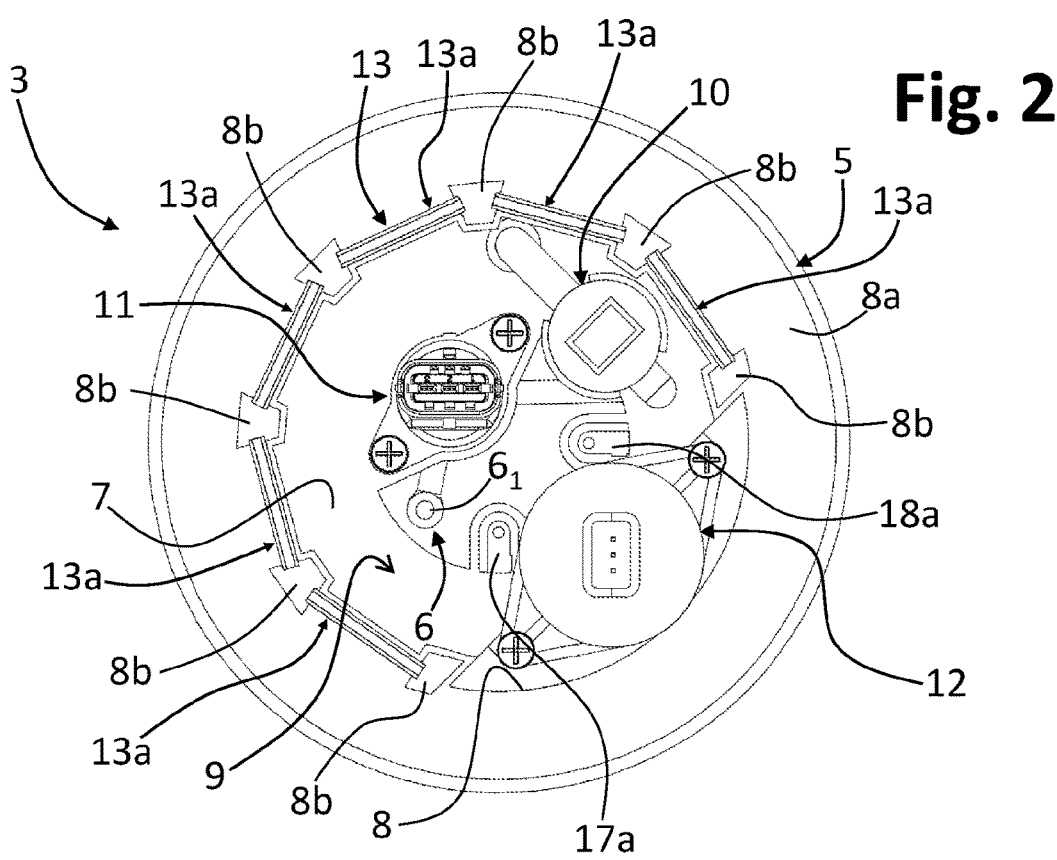
FIG. 2 is a schematic top plan view of a tank component according to one embodiment of the invention.
Figure 3:
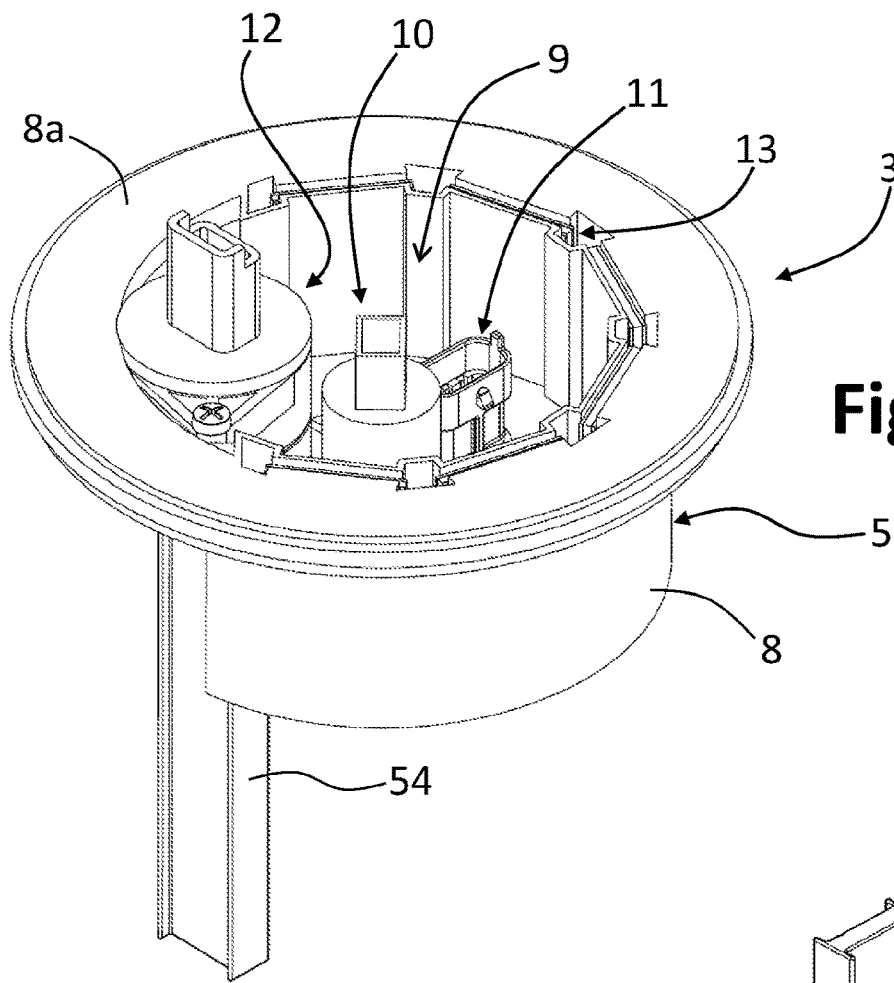
FIGS. 3 and 4 are schematic perspective views of a tank component according to one embodiment of the invention.
Figure 13:
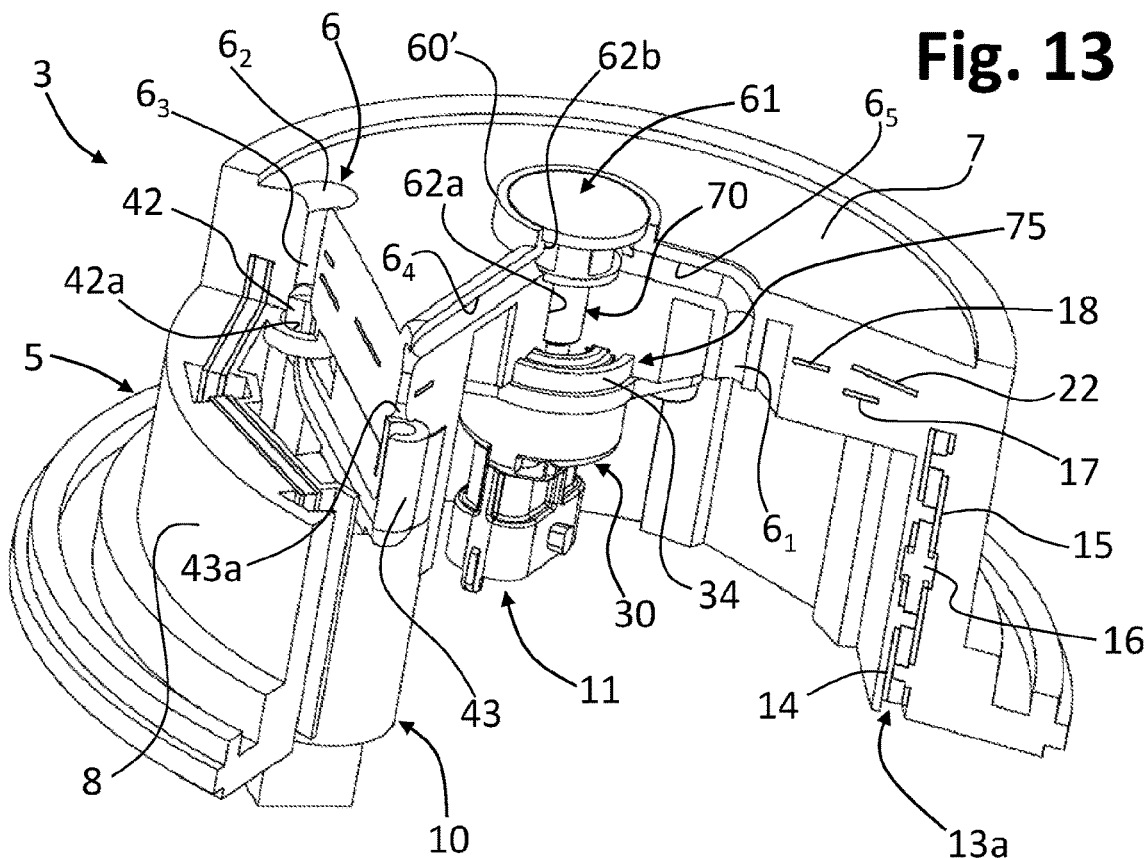
FIG. 13 is a sectioned perspective view of a tank component according to one embodiment of the invention.

In various embodiments described herein, the body 5 has a passageway, partially visible in FIGS. 2 and 13, where it is designated by 6. The passageway 6 has an outlet $6_1$, through which the reducing agent can be supplied to the system 2: preferentially, for this purpose, associated to the body 5 is an expressly designed pump, of a conception in itself known, having a delivery connected in fluid communication with the passageway 6. In various embodiments, the outlet $6_1$ has the conformation of a hydraulic attachment for a duct or pipe belonging to the system 2 (not represented), preferably a hydraulic attachment made of a single piece or integrated or fixed with respect to the body 5 of the component 3, in particular to its wall 7.

Figure 4:
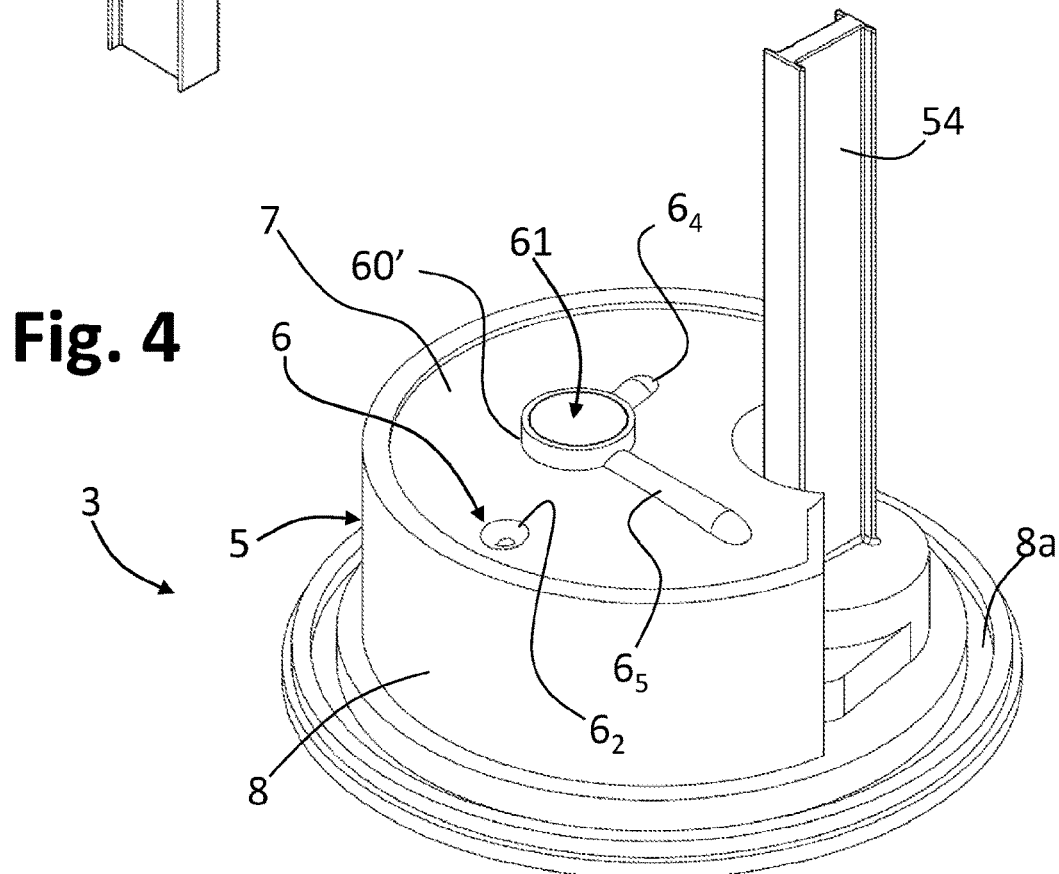
Figure 5:
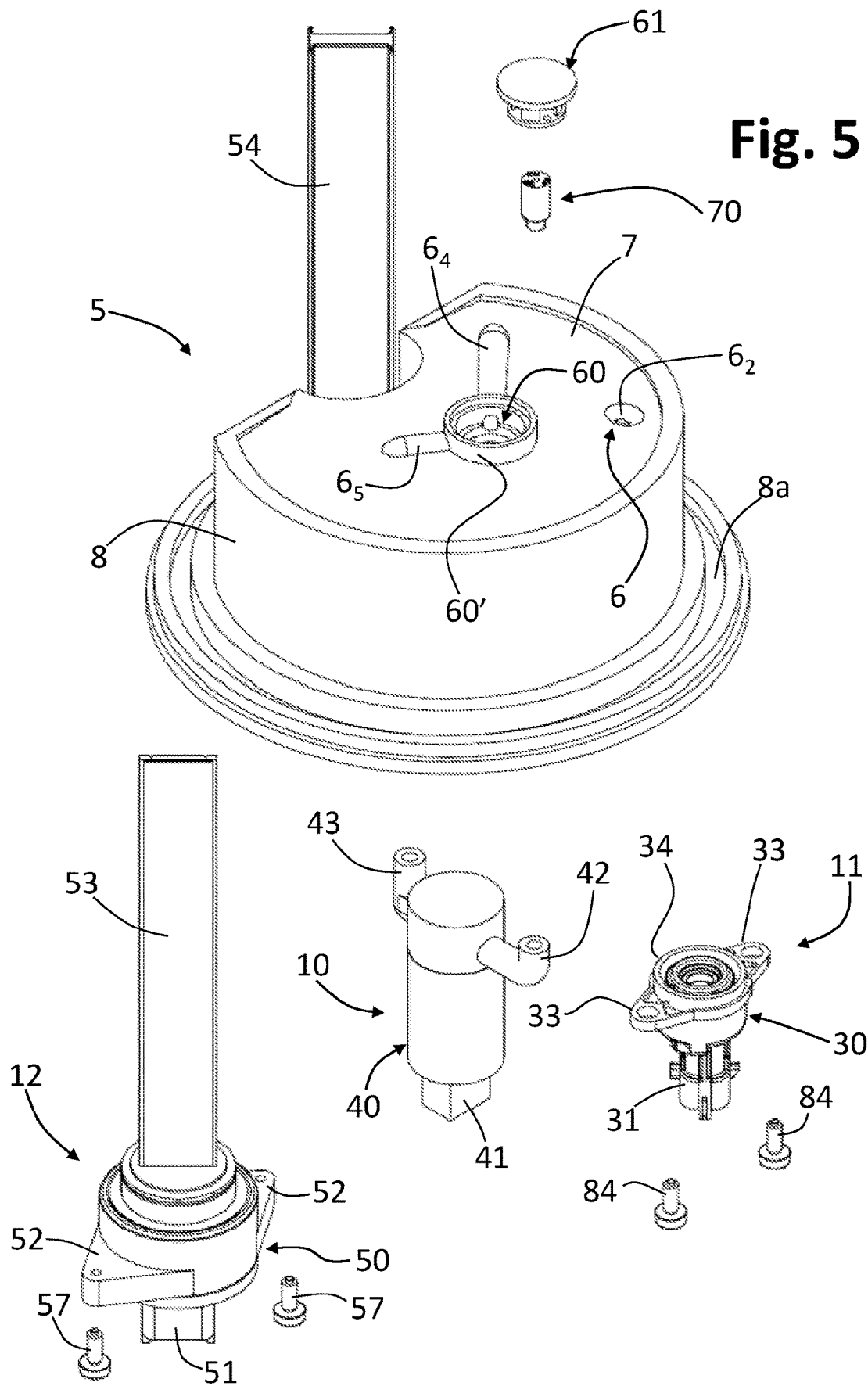
FIGS. 5 and 6 are exploded schematic views, from different angles, of a tank component according to one embodiment of the invention.

In various embodiments, moreover, at least one wall of the body 5 has an inlet of the aforesaid passageway—this inlet being designated by $6_2$, for example, in FIGS. 4 and 5—to enable drawing-off of the reducing agent from the tank 1: as will be seen, the inlet $6_2$ is preferably connected in fluid communication with the intake of the aforesaid pump.

In various embodiments, the body 5 of the component 3 comprises a bottom wall 7 and a peripheral wall 8 that are substantially tubular, preferably made of a single piece. In the example shown, defined at the end of the wall 8 opposite to the wall 7 is a flange 8a projecting outwards, forming part of the system for engagement of the component 3 to the tank 1. Once again with reference to the example illustrated, the peripheral wall 8 is substantially semicylindrical (or, more precisely, substantially shaped like a cylindrical segment), but in other embodiments the wall 8 may have a different shape, for example, substantially tubular with circular section, elliptical section, polygonal section, etc., or else some other shape, not necessarily tubular, in particular a shape with a closed perimetral profile. In preferred embodiments of the invention, at least the bottom wall 7 is a massive, i.e. solid, wall defined at least partially in which are one or more ducts and/or one or more seats for positioning or housing functional elements of the component 3, which could be made at least in part in other walls of the body 5. In other embodiments, the wall 7 may be shaped in such a way as to comprise or define the one or more ducts and the one or more seats.

Also the bottom wall 7 may have various shapes, given in any case that its main function is to contribute to closing the lower opening of the tank 1. In the example, the wall 7 closes at one end—here the upper end—the peripheral wall 8, and with this defines a cavity 9 within which there may housed at least in part, if need be, one or more of the functional devices of the component 3. In various embodiments, in particular, when the component 3 does not comprise a heater or else comprises a heater according to the known art, the body of the component itself may substantially include just the wall 7. The walls 7 and 8 may also be configured as distinct parts, possibly made of materials different from one another, rendered fixed with respect to one another.

In various embodiments, the body of the tank component 3 according to the invention comprises at least one first wall—here exemplified by the peripheral wall 8—in which one or more heating elements of a heater are prevalently integrated. In various embodiments, this body also includes a second wall—here exemplified by the bottom wall 7—that is preferably substantially perpendicular to the first wall, in which there may also be partially integrated the aforesaid heating elements and/or the corresponding electrical connection elements. In various embodiments of the invention, the body of the component 3 comprises, instead of a continuous peripheral wall, a plurality of distinct walls, prevalently integrated in each of which is at least one respective heating element of a heater. According to the type of application, these distinct walls may, however, be set according to an at least approximately ring-like configuration or a radial arrangement, or else according to other configurations.

Preferentially, defined in the bottom wall 7 is at least in part the passageway 6, which, via the inlet $6_2$ makes it possible to draw off the reducing agent and send it to the system 2, via the outlet $6_1$. In various embodiments, for this purpose, associated to the body 5 is the pump referred to previously, designated by 10, preferably set in the cavity 9.

In various embodiments, associated to the component 3 is at least one sensor for detecting a quantity of the reducing agent, which includes an element sensitive to the quantity in question. In the examples considered herein, the aforesaid sensor is a pressure sensor, designated as a whole by 11, for detection of the pressure of the reducing agent inside the tank 1 or of its pressure of delivery or injection by the pump 10. One or more further functional devices may also be associated to the component 3, for example, for detecting other characteristics of the fluid contained in the tank 1. For instance, to the component 3 there may be associated other sensor means, such as a level sensor and/or a temperature sensor and/or a sensor of the quality of the reducing agent. With reference to the case illustrated, housed within the cavity 9 of the body 5 are the aforementioned pressure sensor 11 and, at least partially, a sensor 12 for detecting the level of the reducing agent in the tank 1. Moreover not excluded from the scope of the invention is the case where the component 3 is provided, additionally or alternatively, with sensor means different from the ones indicated, such as a sensor for detecting the quality of the reducing agent, as well as further components, such as a filter.

Given that the reducing agent that is to be contained in the tank 1 is subject to freezing when the tank itself is exposed to low temperatures, in various embodiments also a heater is incorporated in the component 3. This heater may be made according to any technique in itself known and may be associated to or integrated at least partially in the wall 7 and/or in the wall 8. However, in preferential embodiments that are in themselves autonomously inventive, the heater used has at least one heating element that includes a first electrode, a second electrode, and a material having a PTC (Positive Temperature Coefficient) effect set at least in part between the two electrodes, where preferably:

the first electrode, or each first electrode, is generally parallel to and facing a respective second electrode;

the material having a PTC effect comprises an overmoulded plastic-based or polymeric-based material, which is injected between facing surfaces of each of the first and second electrodes; and the body of the tank component 3, in particular the peripheral wall thereof 8, is overmoulded at least in part on each heating element.

Figure 7:
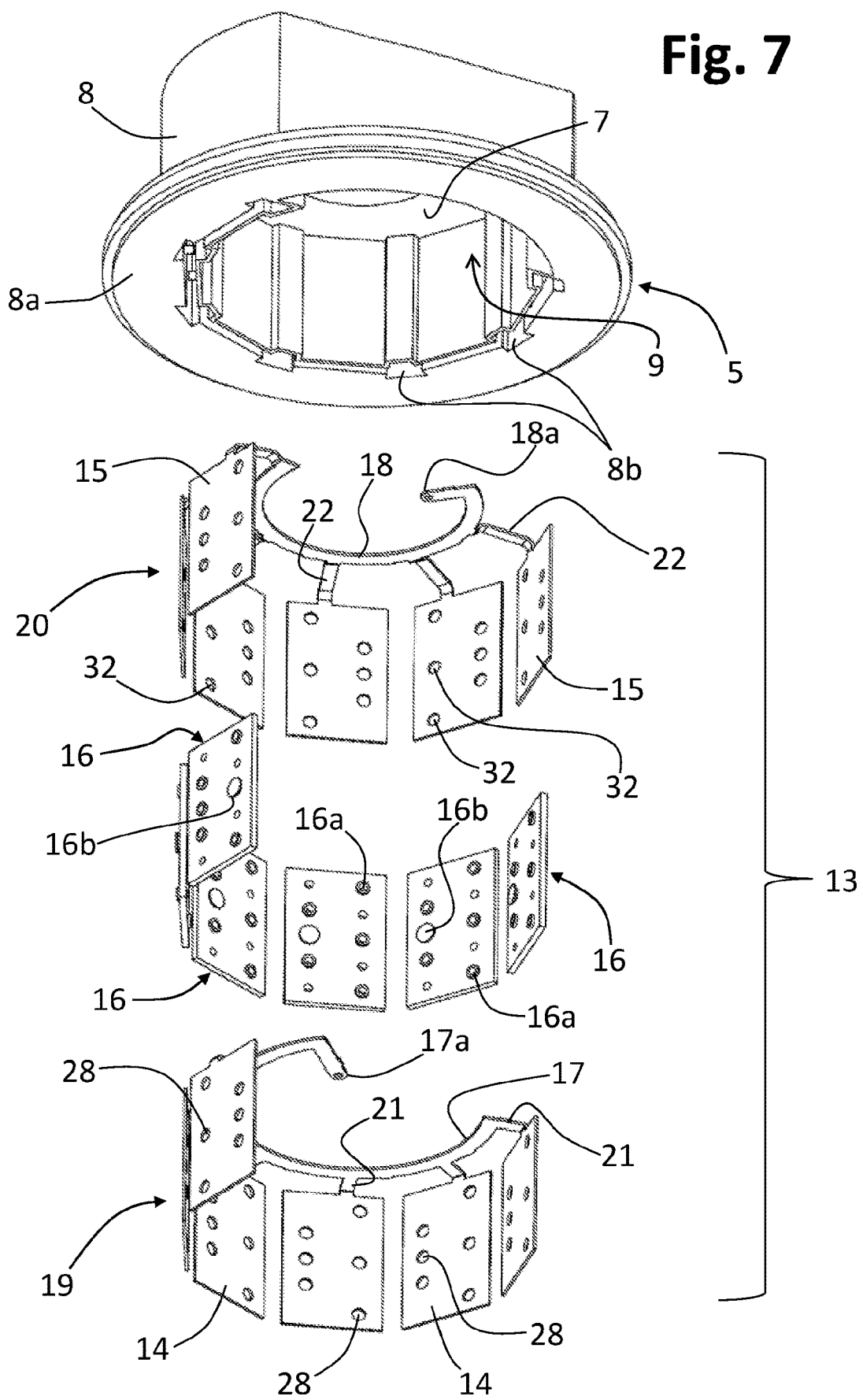
FIG. 7 is an exploded schematic view of a tank component according to one embodiment of the invention, limitedly to a body thereof and to a corresponding heater.
Figure 8:
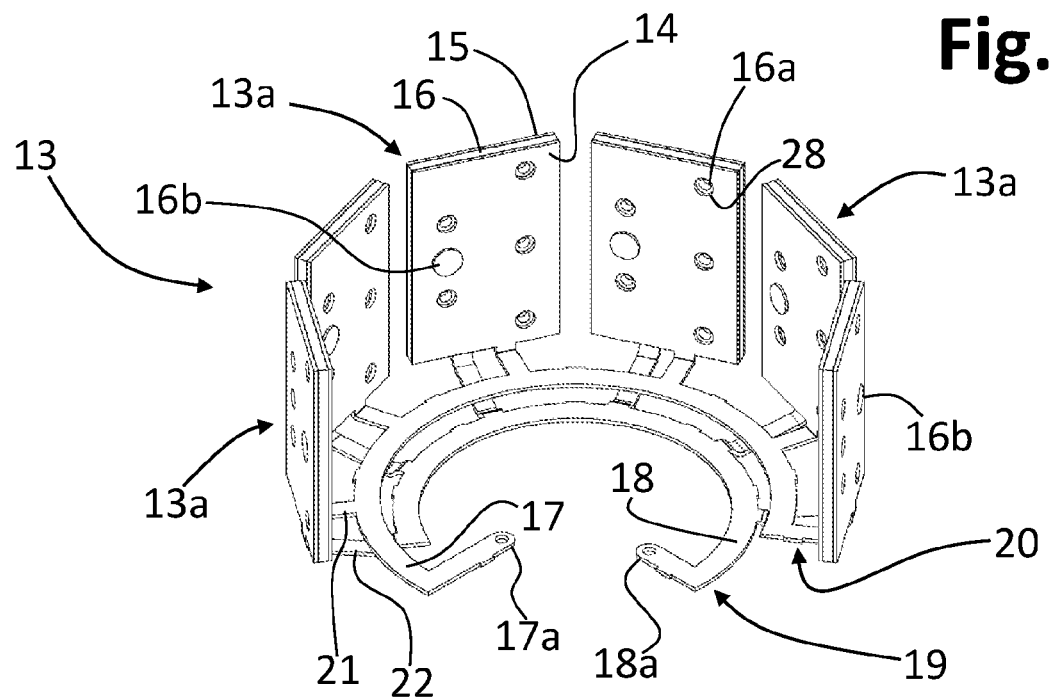
FIGS. 8 and 9 are a schematic perspective view and a schematic top plan view, respectively, of the heater of FIG. 7.
Figure 9:
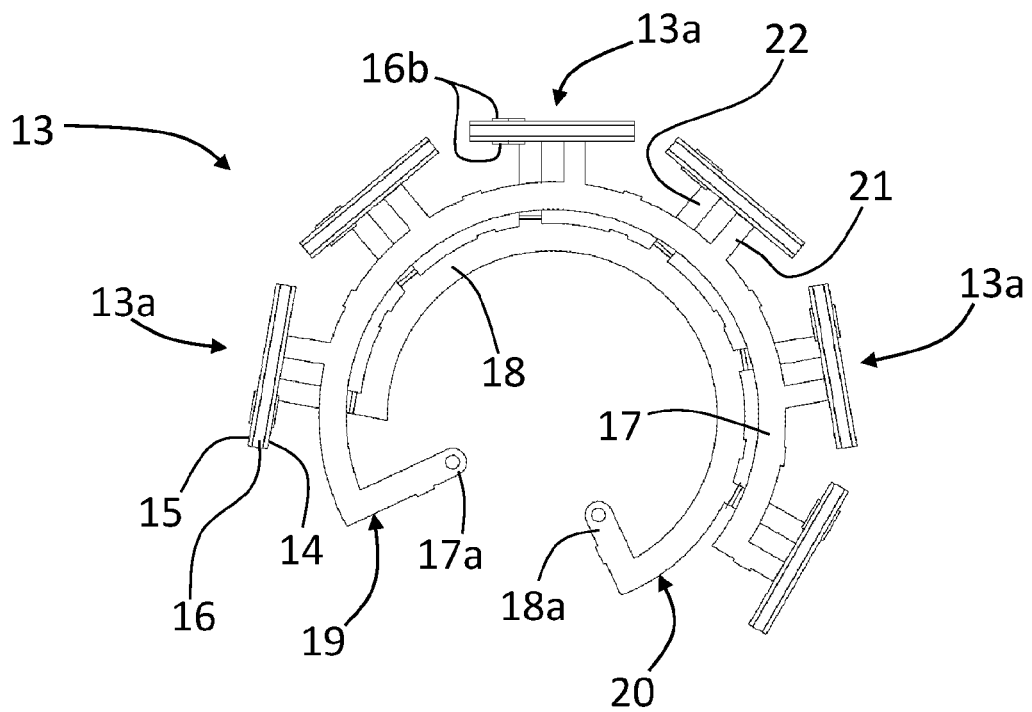

An example of such a heater is designated as a whole by 13 in FIGS. 2-5. With reference to FIGS. 2, 8, and 9, in various embodiments the heater 13 comprises a plurality of heating elements 13a, constituted by PTC resistors. With reference also to FIG. 7, each heating element comprises a first electrode 14 and a second electrode 15, as well as a mass of material 16 having a PTC effect, set at least in part between the two electrodes 14 and 15. The electrodes 14 and 15 are preferably of a laminar or platelike type, but other shapes are not ruled out from the scope of the invention, such as gridlike or comblike shapes.

Preferentially, set in the area comprised between the two facing electrodes 14 and 15 is a prevalent part of the material with PTC effect 16. In various embodiments, a minor or smaller part of the material 16 is set also at the opposite or external faces of the electrodes 14 and 15, preferably to perform functions of fixing and/or positioning of the electrodes themselves.

The heater 13 then includes common conductor elements 17 and 18, to which the electrodes 14 and 15 are respectively connected in parallel. In preferred embodiments, the electrodes 14 are made of a single piece with the corresponding common conductor element 17, providing thereby a first shaped metal lamina, designated by 19 in FIG. 7, whereas the electrodes 15 are made of a single piece with the corresponding common conductor element 18, providing thereby a second shaped metal lamina, designated by 20 in FIG. 7. Preferentially, each of the plates 19 and 20 also defines connection portions, designated by 21 and 22, respectively, which extend between the corresponding common conductor element 17 or 18 and the corresponding laminar electrodes 14 or 15.

According to alternative embodiments, the electrodes 14 and/or 15 are made individually, and even moulded or machined with techniques or shapes that differ from the ones exemplified, and are connected together via respective common electrical conductors configured as added elements, such as relatively rigid metal conductors or conductors of the type referred to as "busbar". In these embodiments, the aforesaid added common conductors may be mechanically and electrically connected to the electrodes via specific operations (for example, welding and/or riveting and/or mutual fixing via mechanical deformation of at least one of the parts in question). Once again for the case of electrodes configured as distinct parts with respect to the corresponding common conductor elements, the latter may be made of an electrically conductive polymeric material, for example, overmoulded at least in part on the electrodes themselves.

A preferential method for obtaining the heater 13 is the one described in the Italian patent application entitled "Dispositivo riscaldatore elettrico, particolarmente per veicoli" ("Electrical heater device, in particular for vehicles") filed on the same date in the name of the present applicant, the relevant teachings of which are incorporated herein for reference.

In summary, according to this method the plates 19 and 20 are shaped—preferably via blanking and/or deformation—starting from a metal plate or strip (for example, made of steel) in order to obtain a first substantially plane or two-dimensional semi-finished product and a second substantially flat or two-dimensional semi-finished product, each of which defines the electrodes 14 or 15, the common conductor 17 or 18 and, if envisaged, the connection portions 21 or 22, respectively. Within the substantially plane shape there may, however, be envisaged areas or parts with different shapes, such as curved or bent parts. In various embodiments, the aforesaid semi-finished products also define accessory portions, such as a peripheral frame, which may be useful for the purposes of handling during production and/or subsequent positioning of the semi-finished products in a mould. In embodiments of this type, the first and second semi-finished products may also include supporting portions that connect the frame to at least one of the common conductor and the electrodes of the corresponding lamina 19 or 20. Preferentially, during the blanking step, the electrodes 14 and 15 are formed with a plurality of seats or passages, designated by 28 and 32, respectively. These seats or passages may include, for example, through holes of the electrodes, as in the case exemplified, or else indentations in the outer profile of the electrodes, or again blind cavities. Also the common conductors 17 and 18 may be blanked so as to present, at their ends, a hole or a shaped portion, in order to define an electrical-connection terminal 17a, 18a, respectively. The shape of these terminals may differ from the one illustrated, and not necessarily be provided with the aforesaid hole.

In various embodiments, the common conductor elements 17 and 18 have a substantially annular development, preferably an open-ring development. In the preferred case illustrated, the development is substantially shaped like an arc of a circle. In embodiments of this type, the corresponding connection portions 21 or 22 extend in a radial direction from the corresponding conductor element 17 or 18. More in general, as will be understood hereinafter, it is preferable for the development in length of the conductor elements 17 and 18 to have a shape substantially congruent with or similar to that of the wall 8 of the body 5. Very preferably, as in the case illustrated, the perimetral dimensions of the conductor element 18 are smaller than those of the conductor element 17 so that the two conductor elements 17 and 18 can be set substantially concentrically and at a distance apart from one another, with the corresponding electrodes 14, 15 in positions substantially facing and/or parallel to one another. In embodiments of this type, it is preferable for the connection portions 22 to have a development in length greater than that of the connection portions 21.

As may be noted, in the example illustrated, the connection portions 21, 22 and the electrodes 14, 15 are distributed and at a distance apart from each other along the development of the corresponding common conductors 17, 18, preferably in a substantially radial arrangement.

The position of the various parts defined by the semi-finished products previously referred to is such that, when the semi-finished products are set on top of one another in generally mutually parallel positions, the electrodes 14 are substantially set parallel to and facing the electrodes 15, at least for a predominant part thereof. These semi-finished products may hence be introduced into a first mould in the aforesaid parallel positions, in order to overmould thereon the material with PTC effect 16 of FIG. 7. In particular, the two semi-finished products are positioned in the aforesaid mould at a predefined distance, which defines the thickness of the material 16 moulded between the electrodes 14 and 15. The mould may be made according to techniques in themselves known.

Injected then into the mould is the material with PTC effect 16, which is preferably a plastic-based or polymeric-based material, preferably including at least two different polymers, very preferably immiscible polymers.

It is to be noted that some known polymers with PTC effect undergo, in the proximity of their melting point, a significant expansion in size, even greater than 10% in volume, causing a localized increase in resistivity. Melting of the polymer during heating induced via electrical supply entails, however, the drop of mechanical performance of the material on account of the decay of the corresponding elastic modulus, and this considerably limits use thereof. These materials are moreover subject to problems of electrical contacting in so far as normally polymers with PTC effect do not have a good adhesion on metals, and this entails a delamination or detachment, with variation of the electrical and thermal performance. These problems are felt more in the case of electrodes of a basically laminar shape, where the greater expansion of the polymer with PTC effect as compared to the metal of the electrodes tends to cause a sort of sliding between the surfaces of the metal electrodes and of the polymer set in between, with consequent detachment between the parts and/or formation of electrically and thermally insulating air gaps. The aforesaid risks of delamination or detachment are accentuated in the case of components or heaters for vehicles, which may be subjected to extreme environmental conditions, with considerable thermal excursions.

For these reasons, according to an autonomously inventive aspect, the plastic-based material 16 comprises a mixture of polymers that are incompatible or not miscible with one another, preferably at least two immiscible polymers, combined so as to obtain a co-continuous composite, such as a three-dimensional structure, where the various polymers intersect, developing in all directions. This mixture is defined so that at least one of the polymers of the composite does not melt during heating induced via electrical supply of the elements 13a, consequently guaranteeing an adequate mechanical strength of the material with PTC effect 16, also in the case where the other polymer or one of the other polymers of the composite reaches melting point during heating induced by electrical supply.

In various embodiments, in order to increase adhesion of the material 16 to the metal that forms the electrodes 14 and 15, the mixture comprises at least one ionomeric polymer, such as an ethylene-based thermoplastic copolymer, with monomers grafted to the polymeric chain containing carboxyl groups partially neutralized by metal ions (for example, sodium or zinc ions), in particular with amounts of ion groups lower than 10% molar on a polyethylene base, such as ionomers of class "Surlyn"™ manufactured by Dupont. In this way, the carboxyl groups of the resistive material create ion-bridge bonds both between the polymeric chains of the material 16 and between the metal ions present on the surface of the electrodes 14 and 15, in particular with respect to ions due to surface oxidation of the electrodes 14, 15, thus improving adhesion of the resistive polymer 16 to the metal of the above electrodes.

In preferred embodiments, the composition of the material with PTC effect 16 comprises a polypropylene (PP) in a percentage of between 39% and 44.5%, an ionomer in a percentage of between 40% and 44.5%, and a conductive additive or a carbon black in a percentage of between 11% and 20%.

After solidification of the injected resistive material, the mould is opened, and a third semifinished product is extracted, which is constituted by the two semi-finished products previously referred to set on top of one another and with the respective parts of the material with PTC effect 16 that each extend between the facing surfaces of the various pairs of electrodes 14-15 to provide the heating elements 13*a*. Preferentially, in this third semifinished product, which is once again substantially plane, the common conductor elements 17 and 18 extend according to respective parallel planes of lie. Once again preferentially, at least one of the conductor elements 17 and 18, here the conductor element 18 of smaller dimensions, is provided with generally curved connection elements 22 (see FIG. 7 or FIG. 8): this solution prevents, in the aforesaid third semi-finished product, the portions 22 form coming into contact with the conductor element 17 during bending operations described hereinafter.

Next, the third semi-finished product is subjected to deformation in order to bestow thereon a different, substantially three-dimensional, shape. In particular, deformation is obtained by bending the heating elements 13*a* with respect to the common conductor elements 17, 18 so that the former will come to assume a position that is generally erected with respect to the latter, as may be seen in FIGS. 8 and 9. In various embodiments, at least one of the common conductor elements 17, 18 lies in a plane that is generally angled, in particular substantially perpendicular, with respect to a plane of lie of the heating elements 13*a*. Preferably, the heating elements 13*a* are bent at 90° or so as to become substantially orthogonal to the original plane of the third semifinished product.

As may be appreciated, following upon deformation, the heating elements 13*a* are set substantially vertical, in a sequence that is approximately curved or with open-ring development, or more in general, a sequence that has a development congruent with the perimetral development of the peripheral wall 8 of the body 5, within which the heater 13 is to be at least partially integrated. As already mentioned, the shape of the wall 8 of the body 5 does not necessarily have to be cylindrical or partially cylindrical. It could be elliptical or polygonal, and in these embodiments the common conductor elements 17 and 18 will have a corresponding shape, or in any case a shape such that, after the operation of bending of the semifinished product, the overall shape represented by the ensemble of the heating elements 13*a* is similar to that of at least part of the aforesaid peripheral wall 8.

In various embodiments, in which the first and second semi-finished products comprise the frame and the supporting portions referred to, after the bending operation, the accessory parts represented by the aforesaid frames and/or supporting portions are removed from the third semi-finished product. Following upon this operation, which can be carried out, for example, via blanking, the heater 13 is formed, which, as may be seen in FIGS. 8-9, is substantially constituted by just the shaped metal laminas 19 and 20 (see FIG. 7) with the material 16 set between the corresponding electrodes 14 and 15.

The heater 13 is then put into a second mould used for forming the body 5 of the component 3. Also this mould may be made according to a technique in itself known. Injected then in the second mould is a plastic material, such as a polymer chemically resistant to the reducing agent or to other fluid, preferably a thermoplastic material, that is to form at least in part the body 5, preferably the entire body 5. The second mould is configured in such a way that the heating elements of the heater 13 are at least partially embedded in the plastic material that is to provide the substantially tubular peripheral wall 8 of the body 5, with this material that hence coats the heating elements at least partially. After a time for awaiting hardening of the injected plastic material, the body 5, overmoulded on the heater 13, can be extracted from the second mould. The body 5 thus obtained is substantially as may be seen in FIG. 6.

As may be noted also from FIG. 2, following upon the overmoulding operation, the heating elements 13*a* (i.e., the corresponding electrodes 14 and 15) are distributed and set at a distance apart from one another along the perimetral direction of the wall 8 of the body 5, here corresponding to its substantially semicylindrical part. With such a configuration, the outer face of the electrodes 15 faces the outer side of the wall 8, whereas the outer face of the electrodes 14 faces the inner side of the wall 8, with the material with PTC effect 16 that extends, instead, between the inner faces of the electrodes themselves. In the example illustrated, the heating elements 13*a* are set angled with respect to one another and at angularly spaced apart along the perimetral direction of the peripheral wall 8.

Figure 6:
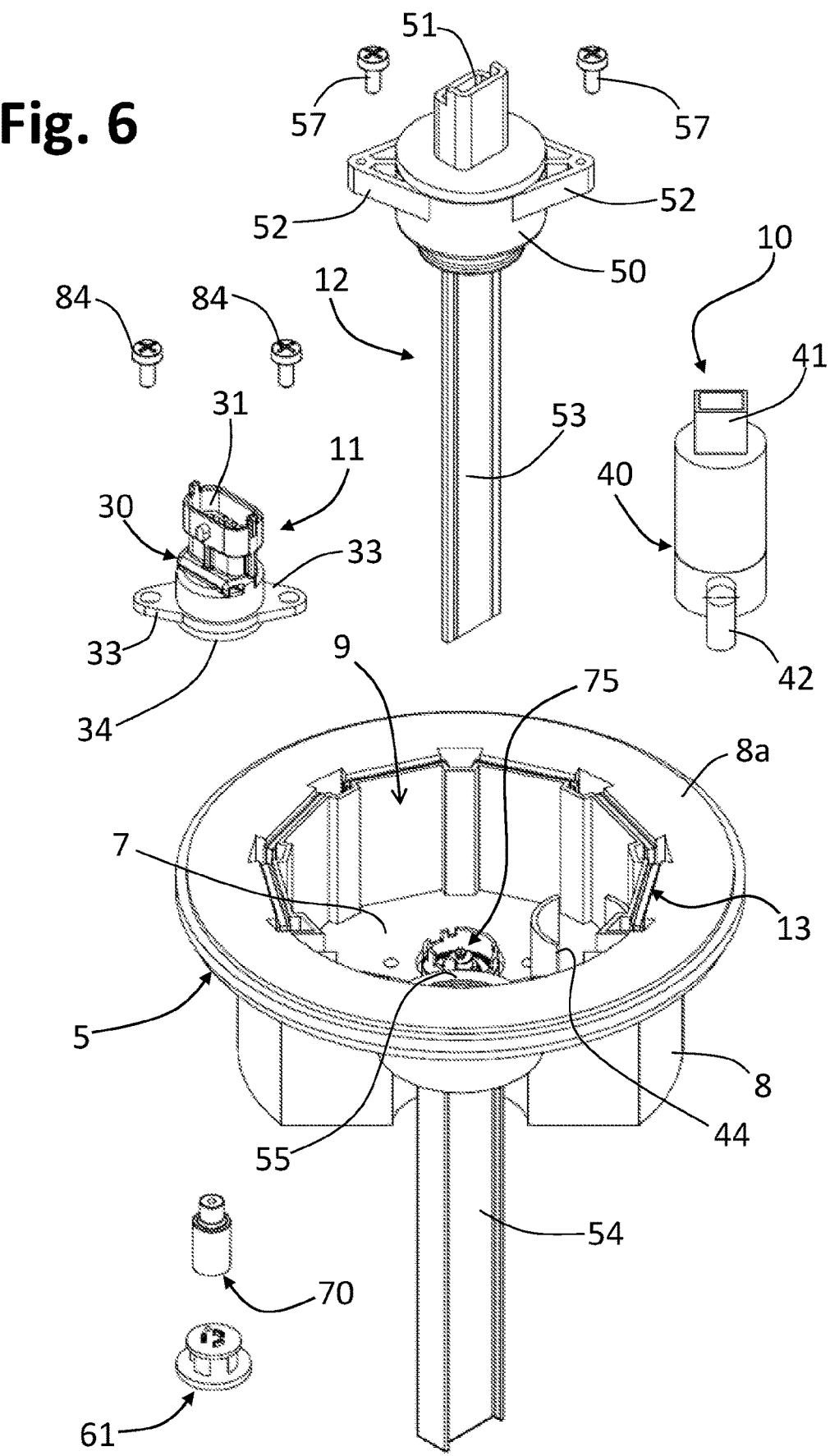

As a consequence, the body 5 is formed with the plastic material, in particular of an electrically insulating type, and preferably of a thermally conductive type, overmoulded on the two shaped laminas 19 and 20 appearing in FIG. 6, with the material with PTC effect 16 set in between.

According to an autonomously inventive aspect, at least part of the body 5 of the tank component 3 is formed with a plastic material of a thermally conductive type, not necessarily overmoulded on or associated to a heater 13 or shaped laminas 19, 20.

The aforesaid plastic material, preferably a polymer, of at least part of the body 5 is preferably added with thermoconductive particles or fillers or in any case with fillers designed to improve thermal conduction, such as ceramic fillers or a metal oxide or a graphite, preferably thermoconductive fillers comprised between 10 wt % and 90 wt %, very preferably 35 wt %, in order to obtain a good thermal conduction and/or an effective dissipation, for example, conduction and/or dissipation of the heat produced by the heater 13 towards the external environment, i.e., towards a liquid or other fluid to be heated, or else in order to obtain a good thermal conduction for detection of temperature. Preferably, the material of the body 5 or of at least a part of body that coats at least in part the heater 13 is made of a PPgMA (polypropylene copolymer grafted with maleic anhydride), even though it may be a different polymer suited to the purpose and chemically resistant to the reducing agent or to other fluid, such as a high-density polyethylene (HDPE).

The aforesaid thermally conductive polymer is injected into a suitable mould to form the body 5 of the component 3, this mould being appropriately shaped for providing shapes or parts of the component 3 and/or parts or seats of other components.

From FIGS. 2 and 13, it may be noted how, in preferred embodiments, the heating elements 13*a* of the heater 13 are prevalently embedded in the overmoulded plastic material that forms a first wall of the body 5, here represented by the peripheral wall 8. In preferred embodiments, as in the one represented, the heating elements 13*a* are partially embedded also in the overmoulded plastic material that forms a second wall of the body 5, here represented by the bottom wall 7. Preferably, at least one of the two common conductor 17 and 18, and preferably both of them, is embedded at least in part in overmoulded plastic material that forms the aforesaid second wall or bottom wall 7. In embodiments not represented, on the other hand, the conductor elements, or at least one of them, could be embedded in the material that forms the wall 8. In principle, moreover, the heating elements 13*a* could also be embedded only in the material that forms the wall 8.

In various embodiments, the heating elements 13*a* are not completely covered by the overmoulded plastic material, in particular at at least one end of the wall 8, as in the case exemplified. If required by the application, the aforesaid areas not covered by the overmoulded material can be covered or protected in some other way, for example, via a resin, sealing elements, or a lid. This characteristic is preferable in order to facilitate moulding and/or compensation of possible dimensional variations of the body 5 when the heater 13 is active.

In various embodiments, the common conductor elements 17 and 18 each have a respective portion not covered by the overmoulded plastic material. This portion, preferably an end portion, is to form the connection terminals of the heating device, already previously designated by 17*a* and 17*b*, possibly shaped for forming at least part of the terminals of an electrical connector. As emerges, for example, from FIG. 2, the aforesaid terminals 17*a* and 17*b* are preferentially accessible inside the cavity 9 of the body 5, preferably substantially at its bottom wall 7.

As already explained, preferentially, the electrodes 14 and 15 have one or more seats or passages, like the holes 28 and 32 of FIG. 7, respectively. In various embodiments, at least some of these passages or holes, following upon the operation of overmoulding of the plastic material that is to form the body 5, are occupied by this material, in order to improve mechanical anchorage of the heater 13 to the body 5. It is also preferable for there to be defined, in the material with PTC effect 16 moulded between two electrodes 14 and 15, cavities substantially aligned axially with respective passages or holes 28 or 32. These cavities may be in part defined by hollow formations in the electrodes 14, 15 and/or in the resistive material 16 and are to be occupied by respective parts of the overmoulded plastic material of the body 5, in particular for the purposes of a positioning and/or fixing of the heater 13 with respect to the body 5. These characteristics emerge, for example, from FIG. 13: see in particular the sectioned part on the right in the figure, where it may be noted how part of the material that provides the body 5 penetrates into holes of the electrodes and/or cavities passing through the material 16.

In preferred embodiments, defined in the peripheral wall 8 of the body 5 are one or more cavities, preferably open in an axial and/or radial direction, distributed and set at a distance apart from one another along the perimetral direction of the wall itself, where giving out or projecting at least in part into each of these cavities is a side edge of at least one heating element 13*a*. The cavities in question are designated in FIG. 2 by 8*b*, and a function thereof is to enable compensation of possible dimensional variations of the heater 13 during its activation and/or of the body 5, when the latter is heated by the heater 13. In the example illustrated, some of these cavities are shaped so as to have in opposite parts the side edges of two different heating elements 13*a*. Two end cavities 8*a* are then envisaged, which receive the outer side edge of the last two heating elements 13*a* of the device 13. The mould used for producing the body 5 is, of course, appropriately shaped for the purpose.

As mentioned, in possible variant embodiments, the peripheral wall 8 may be replaced by a plurality of first distinct walls, for example, having a substantially parallelepipedal shape, which rise from a second common wall, such as the bottom wall 7. Also in this case, the body of the tank component may be made of a thermoplastic material, preferably a good heat conductor, and possibly with fillers for this purpose, in a way similar to what has already been described previously. In embodiments of this type, at least partially integrated in the moulded plastic material that forms each of the aforesaid first walls is a heating element 13*a*, obtained according to the modalities described previously. Also in embodiments of this type, the common conductor elements may be integrated at least in part in the bottom wall and connected to the corresponding electrodes via connection portions.

As already mentioned, the component 3 may comprise further functional devices, and in particular at least one sensor for detecting a characteristic of the reducing agent, such as the pressure sensor 11.

Figure 10:
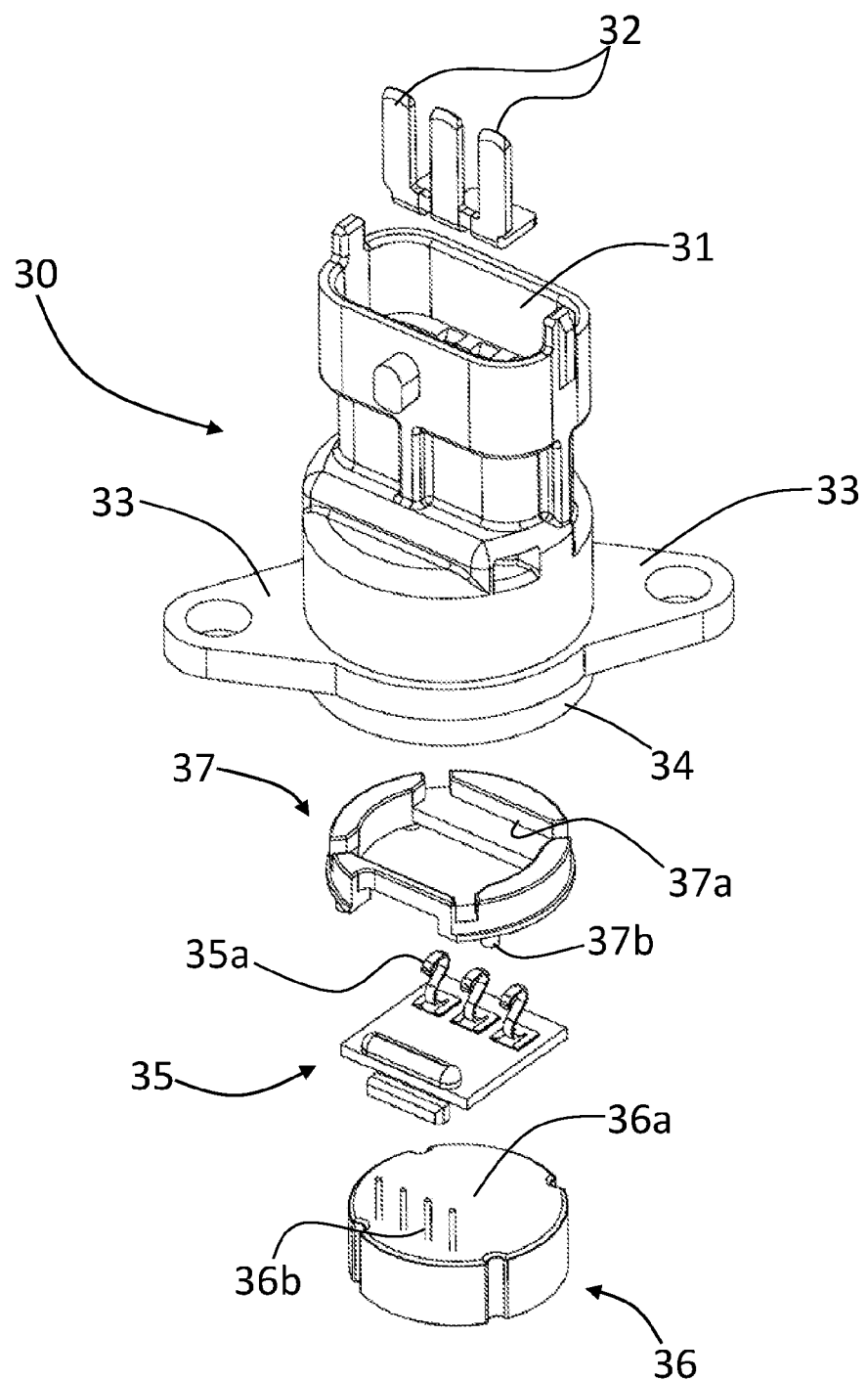
FIG. 10 is an exploded schematic view of a pressure sensor that can be used in a tank component according to one embodiment of the invention.

With reference in particular to FIG. 10, the sensor 11 has a hollow casing body 30 of its own, having a respective end portion 31 shaped for providing a connector, together with corresponding connection terminals 32. In various embodiments, the casing body may be formed with a plastic material overmoulded on the electrical terminals 32. Preferentially, the casing body 30 moreover defines, in a part thereof generally opposite to the portion 31, also brackets 33 for fixing of the body itself to the body 5 of the component 3, in particular at the bottom wall 7.

Very preferably, the body 30 then has, at one front end thereof, a peripheral wall 34, configured for coupling in a corresponding seat—described hereinafter-defined in a wall of the body 5 of the component 3, in particular in its bottom wall 7. In the example of FIG. 10, this wall 34 is substantially cylindrical, but this shape must not be understood as imperative.

Preferably housed in the internal cavity of the casing body 30, substantially comprised between the portion 31 and the wall 34, is a circuit support 35, for example, in the form of a PCB, mounted on which are at least part of the electrical/electronic components of the sensor 11, according to a technique in itself known. The circuit support 35 is electrically connected to the terminals 32 via corresponding contact elements 35*a*, preferably elastic contact elements. The circuit support 35 could also be absent, for example, integrated in the sensitive component 36.

Moreover housed in the cavity of the casing body 30 is a component 36 sensitive to the characteristic of interest of the reducing agent, here the pressure. In the example, the body of the sensitive component 36 defines an elastically deformable membrane 36a. For this purpose, in various embodiments, the body of the element 36 may have a substantially cylindrical shape and may present a blind cavity, not visible, the bottom of which is substantially constituted by the aforesaid membrane 36a. Obviously, other configurations are possible for the body of the sensitive element, according to a technique in itself known. In various embodiments, the body of the sensitive element 36 is made of a ceramic or ceramic-based material, for example, alumina.

Associated to the membrane 36a of the sensitive element 36 are means for detection of a deformation of the membrane itself, induced by the pressure of the fluid subject to measurement, also in this case according to a technique in itself known. These means may comprise, for example, a bridge of resistors, or other piezo-resistive or inductive elements. These detection means are connected, via suitable electrical connections or terminals 36b, to the circuit support 35, so that the electrical signal representing the pressure is appropriately treated, for example, amplified, before reaching the terminals 32, which are in turn connected to the control electronics of the system 2.

Preferentially, in the cavity of the body 30 a spacer support 37 is moreover provided, in an intermediate position between the support 35 and the sensitive element 36. Preferentially, the above support 37 defines, on one side, a seat 37a for the circuit support 35 and, on the other side, elements 37b for positioning with respect to the sensitive element.

With reference to FIGS. 5 and 6, also the pump 10 has a respective casing body 40, having a portion 41 preferably shaped to define—together with terminals not represented—an electrical connector, as well as an intake duct 42 and a delivery duct 43. The electromechanical system internal to the pump 10 may be of any known type. However, preferentially, the ducts 42 and 43 depart from a portion of the casing body 40 housed in which is the impeller of the pump 10, preferably in a direction at least in part parallel or with one and the same orientation.

Hence, in preferred embodiments, the pump is configured as external component distinct from the body 5 of the component 3, but in possible variant embodiments at least part of the pump (for example, the chamber for housing the corresponding impeller), may be defined at least in part by the body 5.

Also the level sensor 12 may be obtained according to a technique in itself known. In preferential embodiments, the level sensor 12 has a hollow body 50, which also preferentially has a portion 51 shaped for defining—together with terminals not represented—a connector, as well as lateral brackets 52 for its fixing to the body 5 of the component 3. The sensor 12 moreover comprises a sensing support 53, longitudinally extended and projecting from the body 50 in order to define a level-sensing axis. The support 53 is provided with sensing elements, not represented, preferably in the form of electrodes that, via an electronic control circuitry housed in the body 50, enables measurement of the level of the agent present in the tank 1. In various embodiments, the sensing support 53 is to be housed in a corresponding fluid-tight casing 54, which is formed integrally with the body 5 of the component 3, or else is fixed thereto in a fluid-tight way, for example, via welding or gluing, or with a mechanical coupling with elastic sealing elements set in between. As may be appreciated, in the assembled condition of the component 3, the casing 54 housing the sensing support 53 projects from beneath towards the inside of the tank 1 in order to enable level sensing.

In various embodiments, the level sensor 12 is made according to the technique described in any of the international patent applications PCT/IB2015/054020, PCT/IB2015/057036, and PCT/IB2015/057043, filed in the name of the present applicant, the teachings of which in this regard are incorporated herein for reference.

Figure 12:
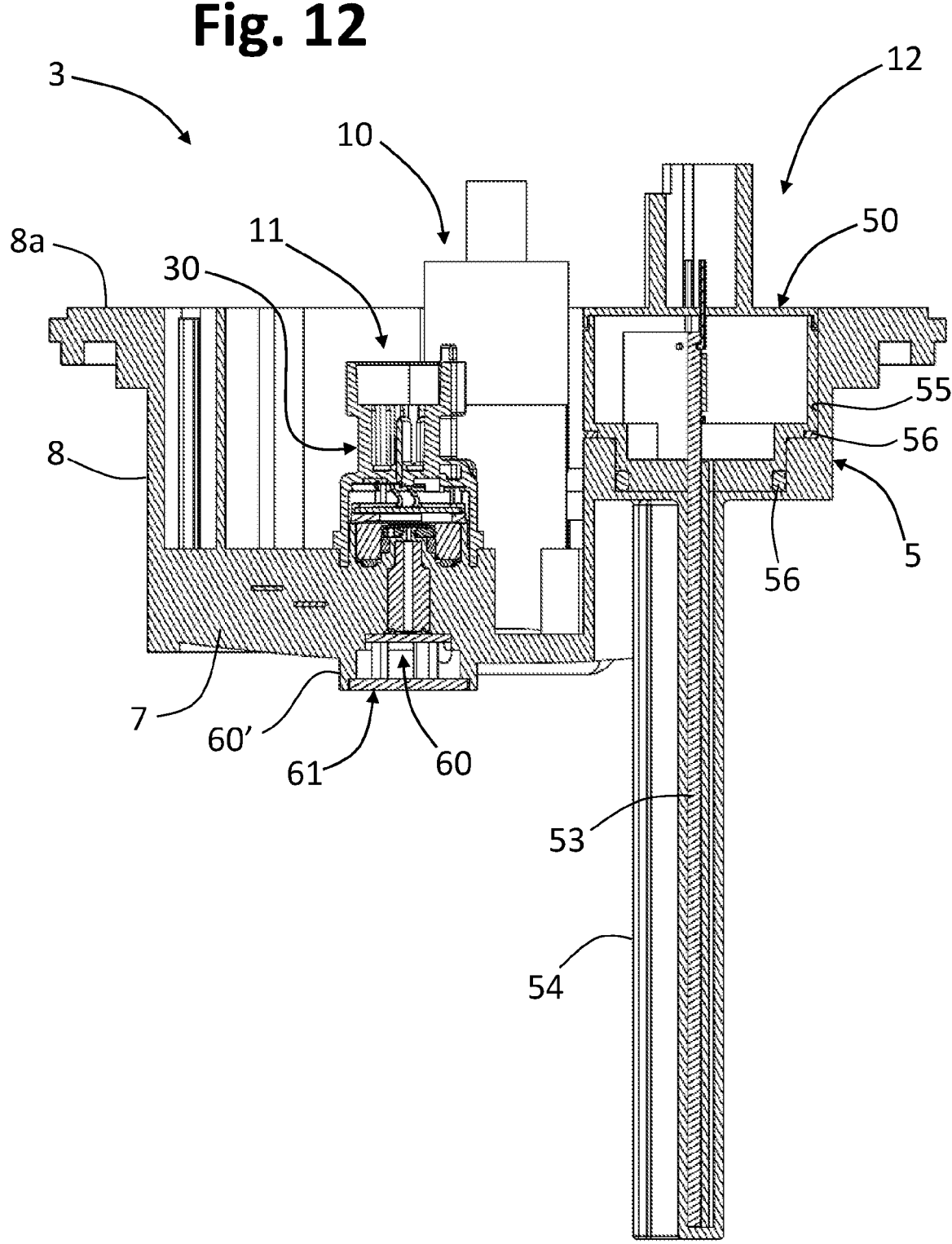
FIG. 12 is a schematic cross-sectional view of a tank component according to one embodiment of the invention.

In various embodiments, the body 5 of the component 3 has an opening, preferably a through opening, which is shaped so as to define a positioning seat for the hollow body 50 of the level sensor 12 and enable its sensing support 53 to project beyond the body 5, towards the inside of the tank 1, albeit within the casing 54. This seat is partially visible in FIG. 6, where it is designated by 55. With reference to FIG. 12, the seat 55 is preferably shaped so as to define two portions having different perimetral dimensions or different diameters in order to receive corresponding shaped portions of the hollow body 50. In the case exemplified, the seat 55 is defined in a position corresponding to the bottom wall 7 of the body 5, and specifically in a lowered portion thereof. Of course, different configurations of positioning and different embodiments of the wall 7 are possible.

In various embodiments, provided between the hollow body 50 and the seat 55 are sealing means, comprising, for example, one or more gaskets 56. Use of these sealing means is preferable also when the casing 54 for the sensing support 53 is configured as part distinct from the body 5, for example, welded thereto, or else fixed in some other way.

In various embodiments, the hollow body 50 of the sensor 12 is fixed to the body 5, in particular to the bottom wall 7, for example, exploiting the presence of the brackets 52 and using for this purpose threaded members, designated by 57, for example, in FIGS. 5 and 6.

In other embodiments (not represented), the body 50 and the seat 55 or the body 5 may envisage a type of coupling that enables fixing of the former with respect to the latter, for example, via mutual engagement or coupling means, such as a bayonet-coupling system or threaded bodies 50 and 5, or else via gluing or welding, such as ultrasound welding or laser welding or melting of part of the material of the bodies 50 and 5.

In various embodiments, the passageway 6 defines in the body wall 7 of the body 5 at least part of at least one of an intake path or way and a delivery path or way for the reducing agent. With reference, for example, to FIG. 13, in various embodiments, the intake path, designated by $6_3$, is in fluid communication with the inlet $6_2$. Possibly, along the intake path $6_3$ a filtering element may be provided. With reference once again to the non-limiting case exemplified, the delivery path preferably includes two stretches $6_4$ and $6_5$, provided between which is a duct for connection to the sensor 11 and/or a positioning seat for a compensation insert, as described hereinafter. The aforesaid delivery path may also envisage just one stretch, and the aforesaid connection to the sensor 11 and the aforesaid seat for the compensation insert may also be provided at at least one of the ends of the delivery duct. The filtering element referred to may also be provided along the delivery path, for example, the one here designated by $6_4$-$6_5$.

Figure 16:
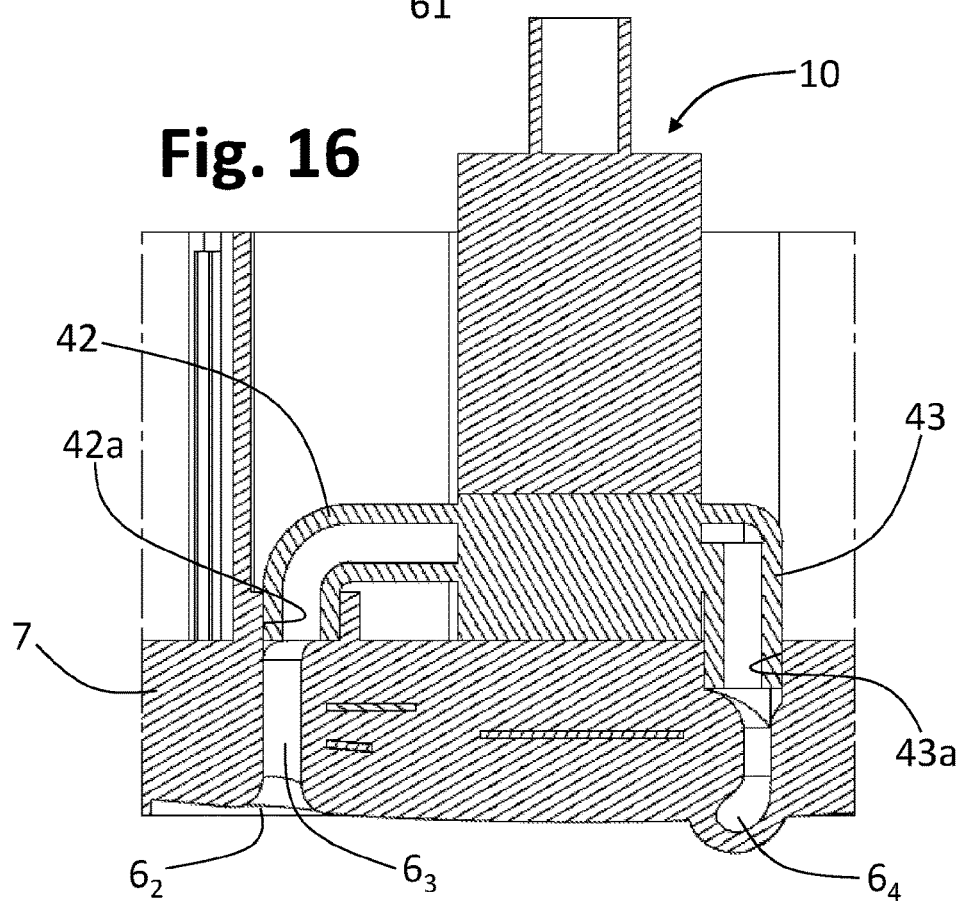

In various embodiments, at least one of the intake and delivery paths has an end that is shaped for providing a coupling seat for the intake duct 42 and for the delivery duct 43, respectively, of the body 40 of the pump 10, as may be seen, for example, in FIG. 16, where these coupling seats, designated by 42*a* and 42*b*, are defined at the bottom wall 7 of the body 5. In various embodiments, the positioning means of the pump 10 also include a seat obtained integrally in the body 5 of the component 3, in particular at its bottom wall 7. A seat of this type, comprising, for example, two opposite walls with a section shaped like an arc of a circle, is designated by 44 in FIG. 6.

According to an inventive aspect, at least one portion of the body 5 of the component 3, in particular in an area corresponding to the passageway 6, is shaped so as to define a positioning seat for at least one compensation insert, which comprises at least one body that is at least in part compressible (or in any case deformable or designed to vary in volume, hereinafter also referred to simply as "compressible body" for brevity), which is designed to come into contact with the reducing agent and is configured for compensating possible variations of volume and/or increases in pressure or excessive forces of the reducing agent, in particular following upon freezing of at least part of the reducing agent present within the body 5 of the component 3 and/or within the passageway 6.

In various embodiments, this portion of the passageway opens at the inner side of the wall 7 (with respect to the tank) and is shaped for receiving the aforesaid compressible body and, preferably, at least part of a corresponding positioning and/or retention element (as will be seen, on the other hand, additionally or alternatively, a compressible body could be positioned at the outer side of the wall 7).

A positioning seat of this type is designated as a whole by 60 in FIG. 5 and, in the case exemplified, is defined in the body 5 in an intermediate position between the two stretches 6$_4$ and 6$_5$ of the passageway 6, in fluid communication therewith.

In various embodiments, the seat 60 has a mouth 60' at the inner side of the bottom wall 7, preferably defined by a peripheral wall in relief, at which an element 61 for closing of the seat 60 and/or for positioning and/or retention of the compensation insert, designated as a whole by 70, may be positioned and/or fixed in a fluid-tight way. The insert 70 may be mounted or moulded directly in the seat 60.

In various embodiments, the insert 70 consists of a body of a predefined shape, made of a compressible material so as to be able to compensate any possible increase in pressure and/or volume of the reducing agent, in the case of freezing of the latter.

In the embodiment currently deemed preferential, it is possible to use a silicone material, such as a silicone elastomer or a liquid silicone rubber, such as LSR (Liquid Silicone Rubber) or FLSR (Fluoro Liquid Silicone Rubber), preferably a bicomponent material or silicone, preferably of the type designed to be moulded or overmoulded or co-moulded via injection moulding.

For the purposes of production of at least part of the compressible body 70, overmoulded or mounted on a part of the component 3 and/or on the body 5, particularly advantageous is the use of materials having a bulk modulus of between 0.1 MPa and 1 GPa, preferably between 0.2 MPa and 100 MPa, very preferably between 0.5 MPa and 10 MPa, in particular of between 1 MPa and 5 MPa. For these compensation elements 70, 80, particularly advantageous is the use of materials having a hardness of between 5 Shore A and 100 Shore A, preferably between 10 Shore A and 70 Shore A, very preferably between 15 Shore A and 30 Shore A.

According to an autonomously inventive aspect there may be envisaged also sealing elements or the like (for example, of the same type as the ones designated hereinafter by 82, 83, 90) preferably overmoulded on at least part of the body 5, for example, made of the same material as the compensation element or of a different mouldable material or polymer.

Advantageously, at least one compensation element and at least one sealing element are provided, or else at least two compensation elements, made of different materials, such as a first material having a hardness of between 5 Shore A and 50 Shore A, preferably between 10 Shore A and 40 Shore A, very preferably between 15 Shore A and 30 Shore A, and a second material having a hardness of between 50 Shore A and 100 Shore A, preferably between 60 Shore A and 90 Shore A, very preferably between 65 Shore A and 80 Shore A.

The compressible body 70 may, however, be made of a spongy or foamed material, preferably of a closed-cell impermeable type, such as EPDM or silicone. The body of the compensation insert may, however, be formed in some other way, for example, with an elastic material provided with an internal compressible chamber or portion, or may comprise a corresponding supporting body made of relatively rigid material, as in other embodiments described hereinafter (the characteristics described above in relation to the material of the compressible body 70 must be understood as applicable also in relation to the compressible body 80 described hereinafter).

In the case exemplified, the compressible body 70 has a roughly cylindrical shape, with two portions 70*a* and 70*b* having different perimetral dimensions, as well as an axial cavity 70*b* for passage of the reducing agent. At least an internal portion of the seat 60, designated by 62*a* in FIGS. 13-15, is shaped accordingly so that the portion 70*a* of the body 70 is preferentially the one closest to the inner side of the wall 7 (with respect to the tank).

In various embodiments, the compressible body 70 that here provides the compensation insert is inserted into the seat 60 from the inner side of the wall 7 and is held in position from beneath via the element 61 (alternatively, a similar seat 60 could be provided on the outer side of the wall 7).

Figure 14:
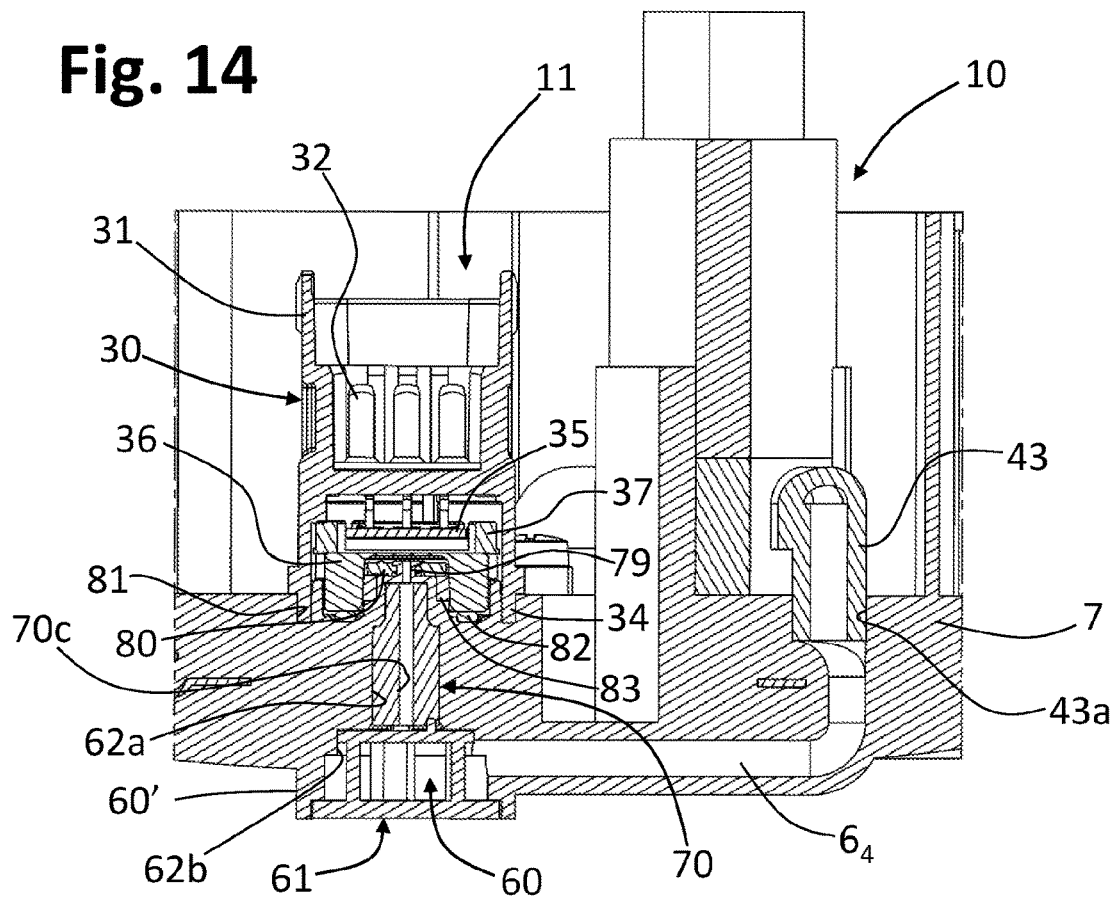
FIGS. 14, 15, and 16 are partial and schematic cross-sectional views of a tank component according to one embodiment of the invention.
Figure 15:
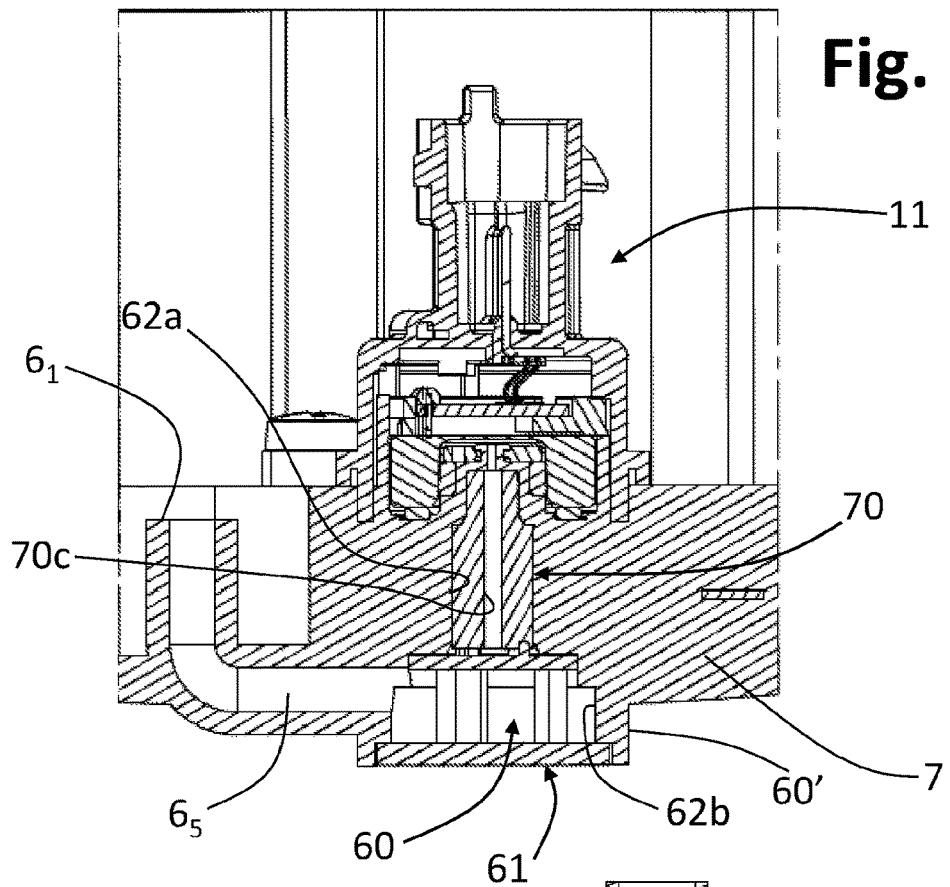

The element 61 has a body configured for enabling passage of the reducing agent, without interfering with its flow in the delivery path 6$_4$-6$_5$, as may be appreciated, for example, from FIGS. 13-15. For this purpose, in the embodiment appearing in FIG. 11, the body of the element 61 has a base 61*a* and a head 61*b* connected together by means of one or more upright elements 61*c*. In the example, the base 61*a* and the head 61*b* are substantially disk-shaped, with the head 61*b* that carries at the top one or more reliefs 61*d*, for resting of an end of the compressible body 70 that provides the compensation insert. The presence of the reliefs 61*d* prevents the end face of the body 70 from resting directly on the head 61*b*, thereby allowing flow of the reducing agent through the axial passage 70*c* of the body 70. In addition or as an alternative, reliefs having a similar function could be envisaged in the face of the body 70 that faces the element 61.

The element 61 is housed at least in part in a corresponding portion of the seat 60, designated by 62*b*, for example, in FIGS. 13-15, with its base (61*a*, FIG. 11) that is fixed in a fluid-tight way on the mouth 60' of the seat itself. The base may be, for example, welded, or glued, or screwed at the said mouth 60'. Even though the head 61*b* is not necessarily mounted in a fluid-tight way in the corresponding housing 60*b*, it is preferable for it to have at least one opening or passage 61*e* (FIG. 11), aimed at enabling flow of the reducing agent towards the axial passage 70c of the body 70. The passage 61e may be axial and aligned with the passage 70c, or else offset and associated to the passage defined also by the reliefs 61d (as in FIG. 11).

A compensation element, having at least part of the characteristics previously described with reference to the compensation element 70 could also be provided in some other part of the body 5 and/or of the passageway 6.

According to another inventive aspect, defined at an outer side of the wall 7 (with respect to the tank) is at least one seat for positioning at least one part of a sensor for detecting a characteristic of interest of the reducing agent, here represented by the pressure sensor 11. Furthermore, in the wall 7 at least one passage is defined, for setting the delivery path of the reducing agent in fluid communication with the sensitive element of the aforesaid sensor. In various embodiments, the seat previously designated by 60 provides part of the passage that sets the delivery path $6_4$-$6_5$ in fluid communication with the sensitive part of the sensor 11.

For this purpose, in various embodiments, the outer side of the wall 7 is shaped, in particular at the passageway 6, so as to define at least one seat for an active element belonging to a respective functional device of the component 3, in particular the sensitive element of a sensor means.

For instance, in a preferred embodiment, such as the one represented, the outer side of the wall 7 of the component 3 is shaped, preferably at the seat 60, so as to define a positioning seat for the pressure-sensitive element 36 of the sensor 11. An example of such a seat obtained in the body 5 of the component 3 is designated by 75 in FIG. 11. In the case exemplified, the seat 75 is delimited by a peripheral wall 76 defined in the body 5, here substantially cylindrical, and a bottom 77, which is also defined in the body 5. According to embodiments not represented, the outer side of the wall 7 is shaped for defining a seat that, in addition to the sensitive element 36, houses also a respective circuit support 35.

In various embodiments, the portion of the body 5 that defines a positioning seat for a compensation insert comprises part of the outer side of the wall 7, this part being shaped for providing a support for a compressible body.

With reference to the case illustrated, in various embodiments, rising from the bottom 77 of the seat 75 is a formation 78, preferably perforated or hollow, within which there may be partially housed at least part of the compressible body 70, and specifically its narrower portion 70b (see for reference also FIG. 14, where the formation 78 is not represented for reasons of clarity).

The formation 78 carries at the top a projections 79 provided with axial passage 79a, which sets the seat 60 in fluid communication with the seat 75. This projection 79 provides a positioning seat for a corresponding compressible body, designated as a whole by 80, which is preferably set so as to surround the projection itself at least partially. This body 80 is preferably substantially disk-shaped, with a central hole 80a for positioning on the projection 79 (see for reference also FIG. 14). However, for use of other types of sensitive elements 36, the seat 75 made in the body 5 of the component 3 could even be without the formation 78, or else this could have a shape different from the one exemplified.

Figure 11:
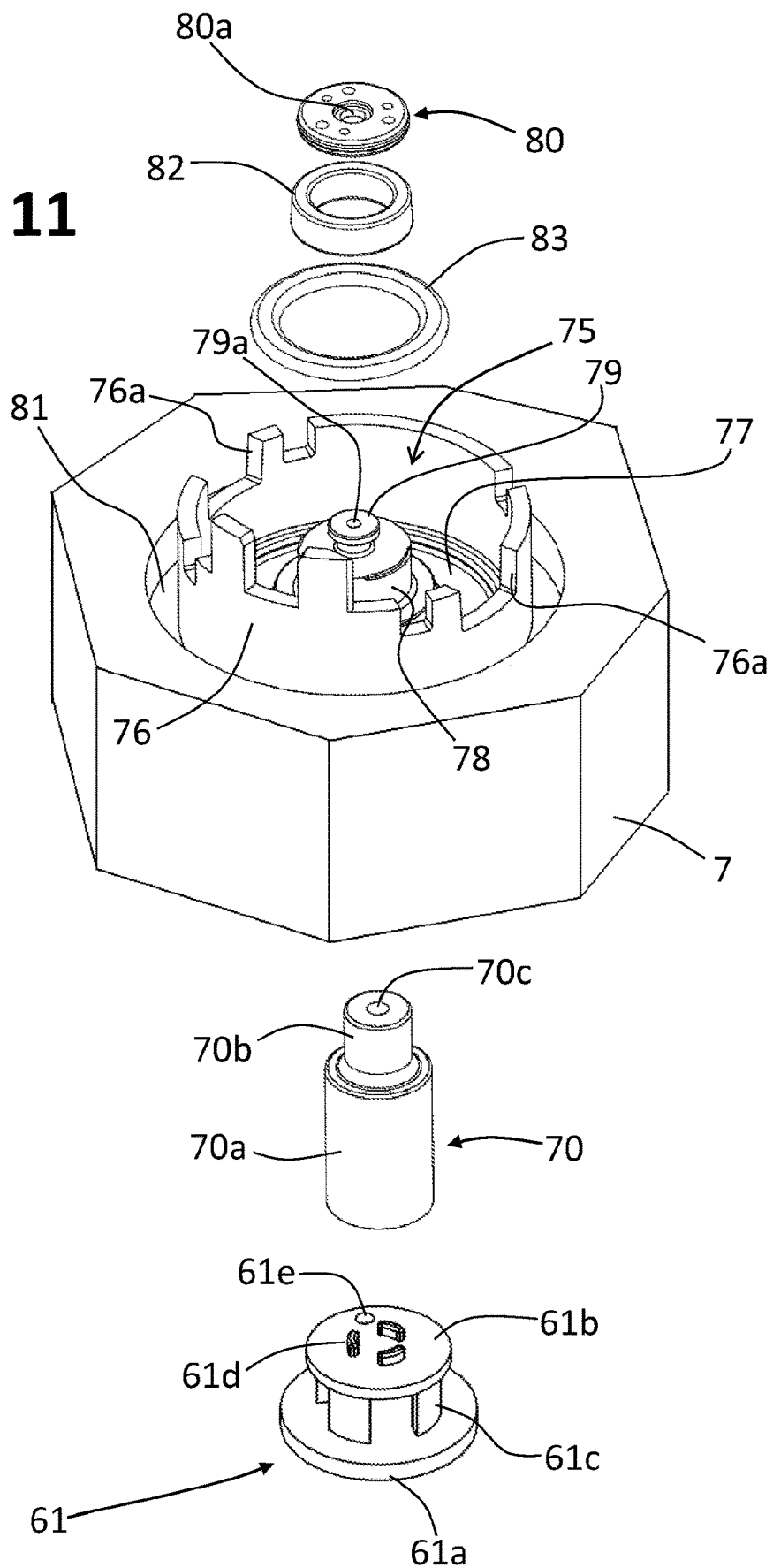
FIG. 11 is an exploded schematic view of a portion of a tank component according to one embodiment of the invention.

In various embodiments, the outer side of the wall 7 is shaped for defining a positioning seat for an end portion of the casing body of a functional device associated to the component 3, such as the casing body 30 of the sensor 11. This further seat, designated by 81 in FIG. 11, is preferentially located in a peripheral position with respect to the seat 75 and is configured for receiving at least partially the end wall 34 of the body 30 of the sensor 11, as emerges clearly also from FIG. 14. In this way, in effect, the entire casing of the pressure sensor 11 (or other sensor) is in part obtained by the body 30 and in part by the body 5 itself of the component 3.

In various embodiments, set between the body 5 of the component 3 and the sensitive element of a sensor is at least one of a sealing element and an elastic supporting element. With reference to the example illustrated, at least one of a sealing element and an elastic supporting element is set between a surface of the seat 75 and the sensitive element 36 of the sensor 11. In the case exemplified in FIG. 11, both the aforesaid sealing element, designated by 82, and the elastic supporting element, designated by 83, are provided. In the assembled condition, the element 83 is arranged between the bottom 77 of the seat 75 and the bottom face of the sensitive element 36, which in this way is supported elastically. The annular sealing element 82 operates, instead, between an outer surface of the formation 78 and a peripheral surface of the blind cavity of the sensitive element 36, thereby delimiting at the bottom a sensing chamber, the upper part of which is, instead, delimited by the membrane of the sensitive element 36 itself (see, for reference, also FIG. 14).

For the purposes of assembling, the element 83 is arranged on the bottom 77 of the seat 75, the element 82 is fitted on the formation 78, and the compressible body 80 is associated to the projection 79. Alternatively, at least one of a sealing element and a compensation element, such as the sealing elements 82 and 83 and/or the compressible elements 70 and 80, is overmoulded on the body 5 or on the formation 78 of the component 3. A sealing element and/or a compressible element could also be overmoulded on or co-moulded with the closing element 61.

The body 30 of the pressure sensor, preferably with the sensitive element 36, the support 37, and the circuit 35 already pre-assembled within it, is then fitted on the outer side of the bottom wall 7 of the body 5 so that its end wall 34 will occupy the seat 81. In this way, the sensitive element 36 comes to rest on the elastic supporting element 83, and the sealing element 82 operates between the cavity of the sensitive element 36 and the formation 78, as described previously. It will be appreciated that, following upon this positioning, the passage 79a of the appendage 79 faces the membrane 36a (FIG. 10) of the sensitive element 36, with the compressible body 80 that is in the proximity of the membrane. Following upon this positioning, moreover, the peripheral wall 76 of the seat 75 projects inside the body 30 of the sensor, and it is preferable for this wall to define reliefs and/or recesses 76a (see FIG. 11) designed to determine a unique orientation of the body 30 in the seat 81, as well as correct positioning of the sensitive element 36 and/or of the support 37 internal to the sensor 11.

The body 30 can then be fixed in position with respect to the bottom wall 7, for example, by exploiting the presence of the brackets 33 (FIG. 10), with the aid of suitable threaded means 84 (see FIGS. 5 and 6).

On the other side, i.e., on the inner side of the wall 7, the compressible body 70 is inserted or moulded in the seat 60 so that its portions 70a and 70b (FIG. 11) will occupy the corresponding portions of the part of seat 62a (FIG. 14). Following upon this positioning, the passage 70c of the body 70 is axially aligned with the passage 79a of the projection 79 (FIG. 11). The seat 60 is then closed by means of the element 61, which in the case of mounting withholds the body 70 in position and guarantees correct positioning thereof, as already explained above. The base of the element 61 is fixed in a fluid-tight way at the mouth 60' of the seat 60.

In use of the system 2 of FIG. 1, and with reference, for example, to FIG. 13, activation of the pump 10 determines drawing-off and delivery of the reducing agent via the passageway 6. More in particular, the reducing agent is drawn off by the tank 1 via the inlet $6_2$ and the corresponding intake path $6_3$, to which the intake duct 42 of the pump 10 is connected. The pump 10 hence forces the reducing agent through its own delivery duct 43 and along the delivery path $6_4$-$6_5$, as far as the outlet $6_1$, from which the reducing agent reaches the system 2 via a suitable pipe, not represented.

In the course of its passage along the path $6_4$-$6_5$, part of the liquid that flows in the part 62b of the seat 60 is induced to flow or in any case cause variations of pressure in the axial passage 70c of the body 70 (FIGS. 11 and 14) and then, through the passage 79a of the projection 79 (FIG. 11), to reach the sensing chamber delimited between the formation 78, the sealing element 82, and the sensitive element 36. The pressure of the fluid determines deflexion of the membrane 36a, the degree of which is detected by the sensing element provided on the membrane itself, the output signal of which hence represents the delivery pressure of the pump 10 and/or the outlet pressure of the hydraulic attachment $6_1$, preferably corresponding to the pressure of injection of the reducing agent into the system 2.

With the pump 10 inactive, part of the reducing agent can accumulate within the aforesaid sensing chamber and within the axial passage 70c of the compressible body 70. In conditions of low ambient temperature, the liquid accumulated may freeze, and hence increase in volume. The increase in volume of the part of liquid accumulated within the compressible body 70 is compensated by compression of the body itself, thereby reducing the thrust towards the membrane 36a of the sensitive element 36 by the frozen liquid. Furthermore, the fact that the compressible body 80 is preferably provided in the cavity of the sensitive element 36 enables reduction to a minimum of the risks of stress on the membrane of the sensitive element, on account of the fact that also the body 80 can be compressed by the thrust of the fluid, which, by freezing, increases in volume. In addition to this, the fact that the cavity of the sensitive component 36 is prevalently occupied by the elements 82, 79, 79, and 80 has the consequence that the useful volume in which the liquid can accumulate in the proximity of the membrane is very small.

Of course, according to embodiments not represented, even just one of the two compressible bodies 70 and 80 may be used and/or other compressible bodies may be set in other areas of the duct 6 and/or chambers 60 and/or of the body 5 of the component 3, possibly associated to inserts 71 that can be fixed to the body 5.

According to an autonomously inventive aspect, according to embodiments not represented, at least one compressible body may be used, mounted or moulded, in a body or part of the pump 10 and/or in at least one of its intake duct 42 and its delivery duct 43, in particular in order to prevent damage to parts or ducts of the pump or associated thereto following upon freezing of the liquid or reducing agent.

Figure 17:
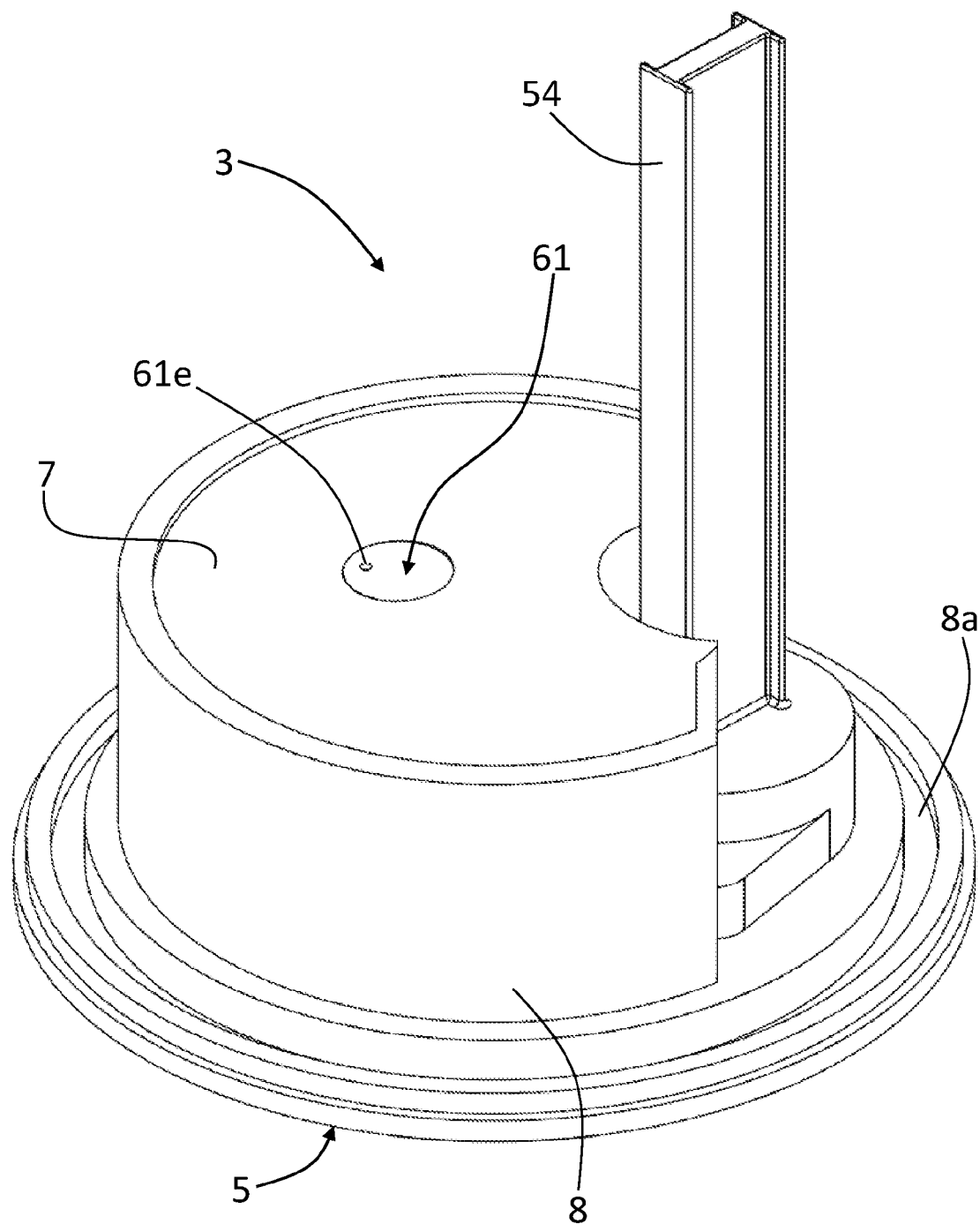
FIG. 17 is a schematic perspective view of a tank component according to a further embodiment of the invention.
Figure 18:
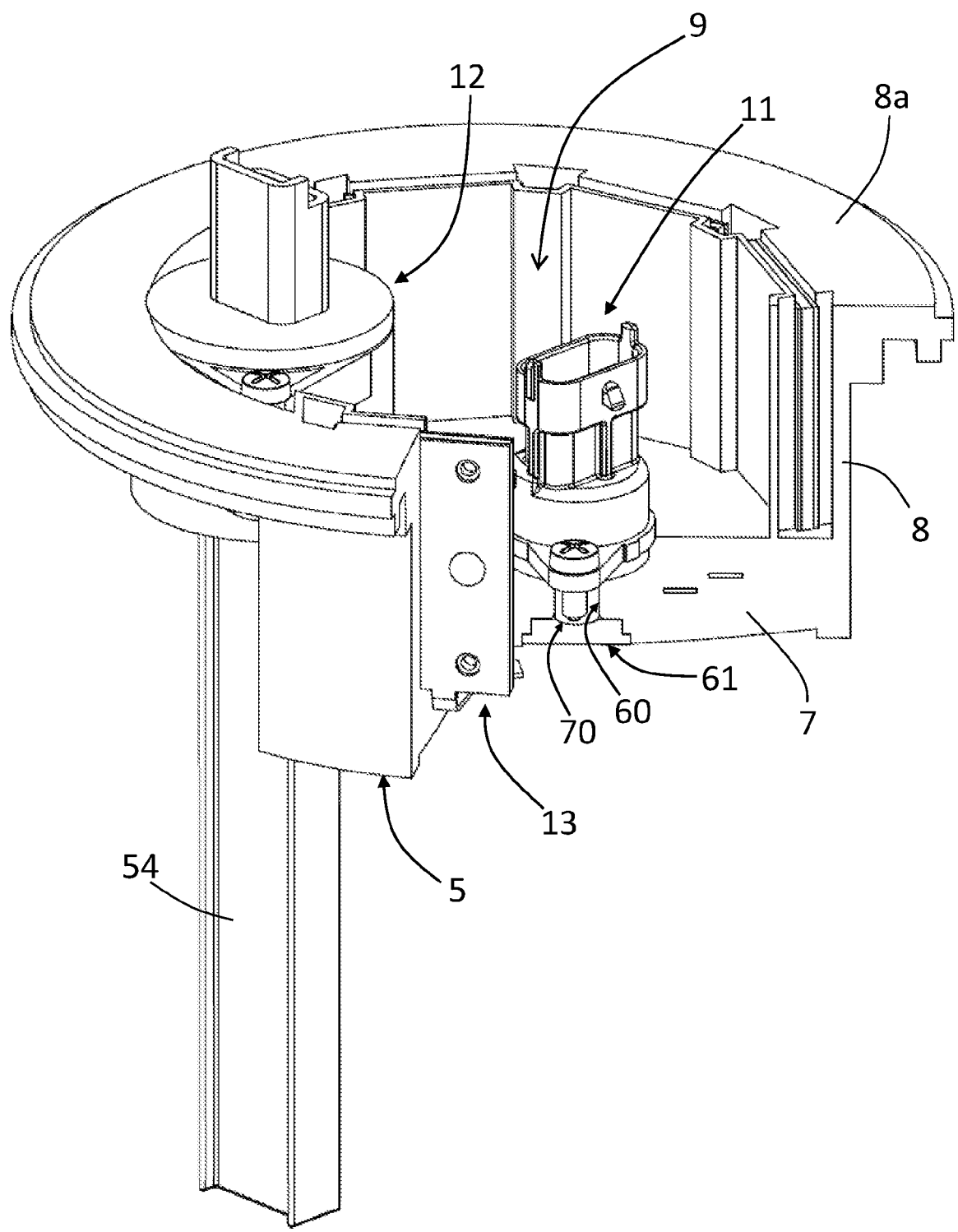
FIG. 18 is a schematic sectioned perspective view of the tank component of FIG. 17.
Figure 19:
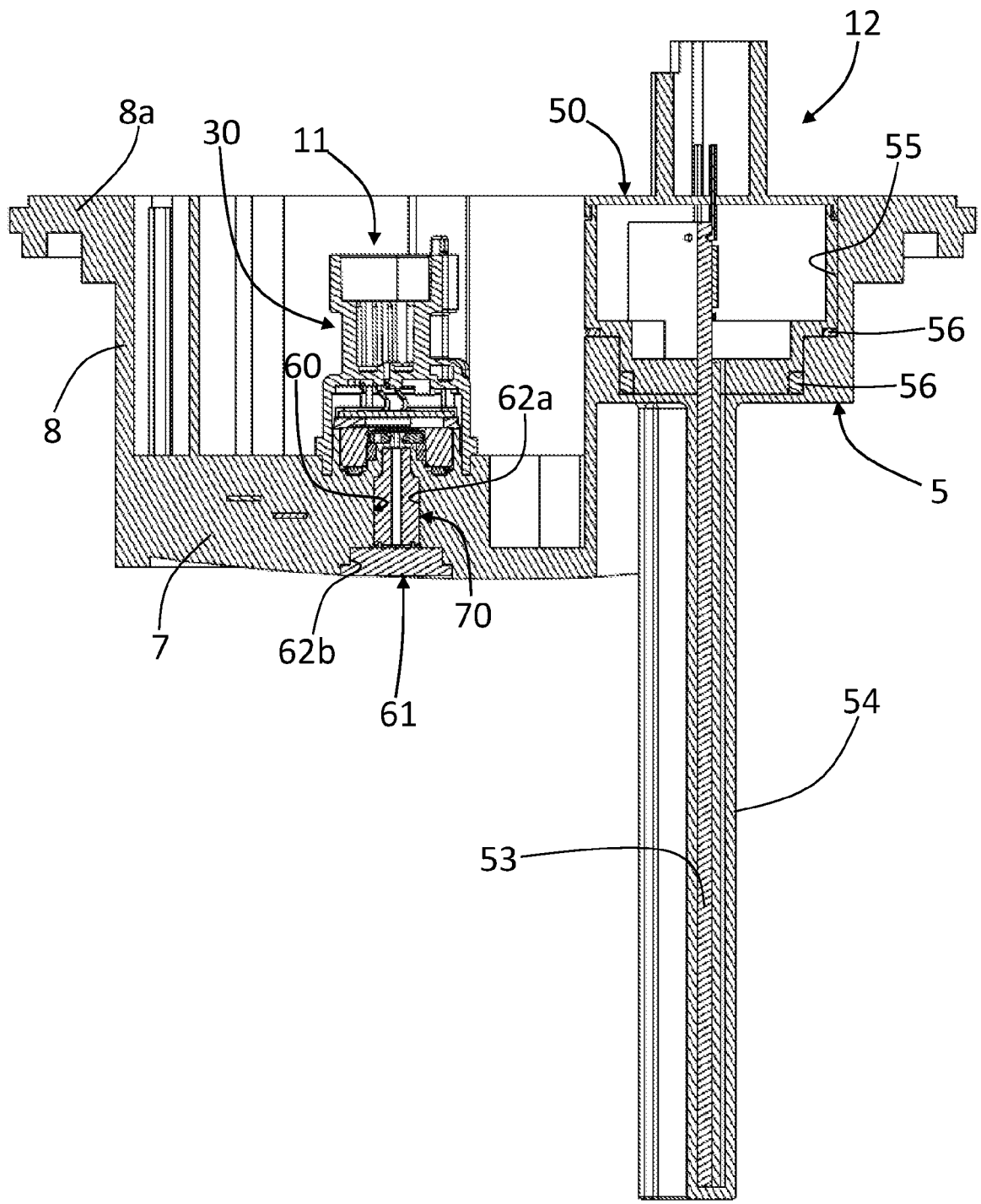
FIG. 19 is a schematic cross-sectional view of the tank component of FIGS. 17 and 18.
Figure 20:
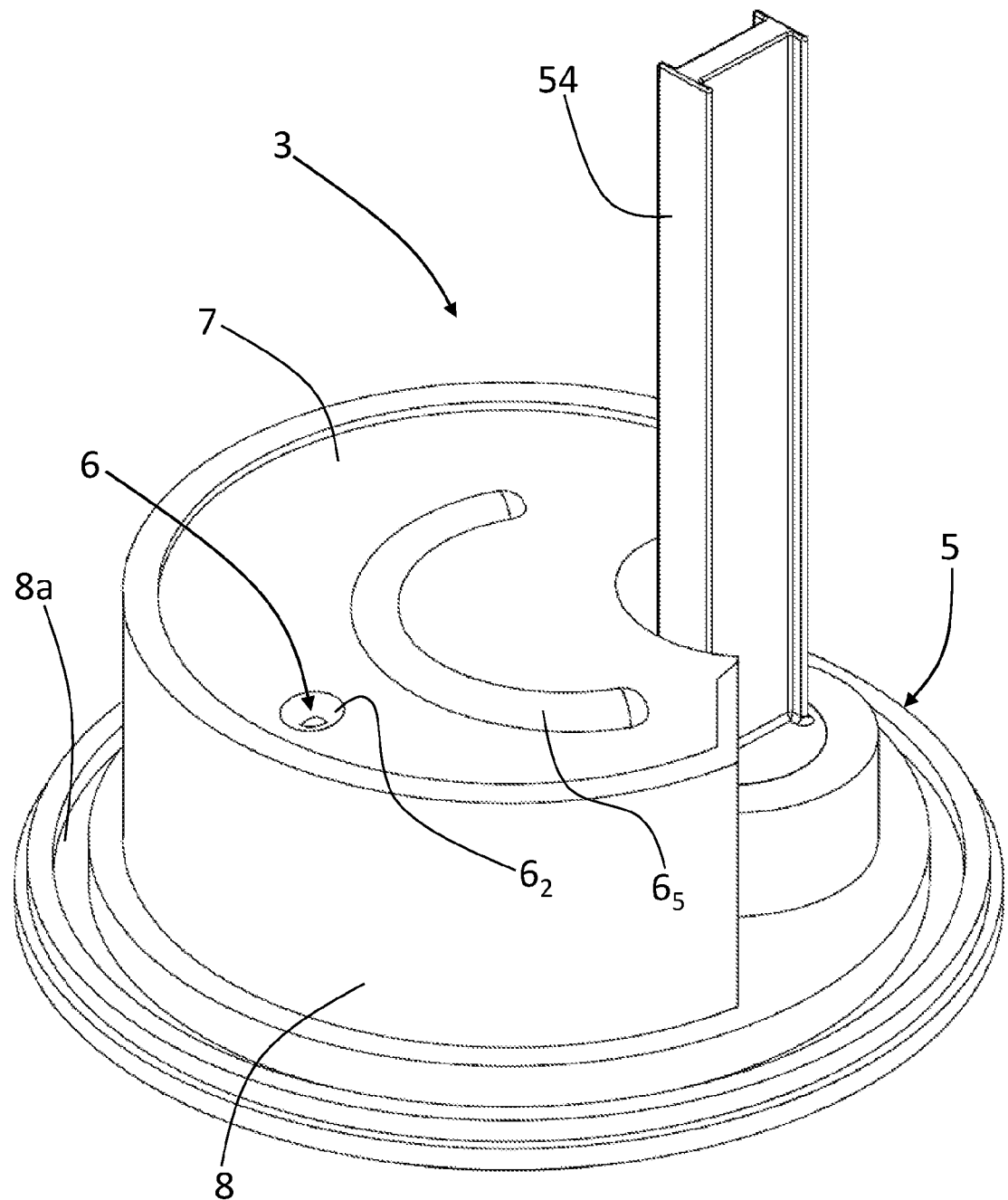
FIG. 20 is a schematic perspective view of a tank component according to a further embodiment of the invention.

FIGS. 17-19—where the same reference numbers as those of the previous figures are used to designate elements that are technically equivalent to the ones already described—regard embodiments in which the tank component 3 does not have a pump (positioned elsewhere) and where the sensor 11 is used for detecting the pressure of the reducing agent in the tank 1, in particular of the column of the reducing agent that impinges on the component 3, for example, in order to deduce the level of the agent itself, or else to detect any anomalous reduction or increase in pressure in the tank, which could be indicative of anomalies and/or could alter proper outflow of the liquid.

Also in this embodiment, the body 5 of the component 3 in any case comprises a passageway for the reducing agent, used only for the purposes of pressure sensing. Also in this case, what has been described for the pressure sensor 11 may apply also to other types of sensors, for example, for detecting the quality of the reducing agent.

In this embodiment, the passageway is substantially constituted by the seat 60, which also here has a portion 62a, for housing of a compressible body 70, that provides a compensation insert, and the portion 62b, for housing the retention or withholding element 61. In this case, the element 61 has a passage 61e for setting the inside of the tank in communication with the seat 60 and, hence, with the axial cavity of the body 70. Also in this embodiment, it is preferable for the element 61 and/or for the compressible body 70 to include one or more reliefs for resting the facing ends of the body 70. For the rest, the embodiment appearing in FIGS. 17-19 is similar to the ones already described previously, as emerges, for example, from FIG. 19. In this example, in the wall 7 the intake path and the delivery path of the reducing agent are not present. However, if need be, there could be envisaged for the liquid a duct functionally similar to the passageway 6 described previously and/or a pump associated to respective intake and delivery ducts, independent of the passageway of the pressure sensor 11.

In embodiments alternative to the ones described so far, the tank component 3 according to the invention envisages at least one compensation insert that comprises a positioning body, preferably made of a substantially rigid material, associated to which is at least one compressible body, the positioning body being preferably designed to be coupled and/or fixed to the body 5 of the component 3, in particular in a fluid-tight way. Embodiments of this type are described, for example, with reference to FIGS. 20-27 and 28-30, where the same reference numbers as those of the previous figures are used to designate elements that are technically equivalent to the ones already described.

As may be noted in particular in FIG. 21, in embodiments of this type a pressure sensor 11 may be used similar to the one described previously with reference to FIG. 10, which is, however, to be associated to a compensation insert separate both from the body 30 of the sensor and from the body 5 of the component 3.

The above positioning body, designated as a whole by 70' in FIG. 22, is preferentially shaped so as to define at least one of a housing, for receiving inside it a corresponding compressible body, and a positioning element, for supporting on its outside a corresponding compressible body. The body 70' is made of a rigid material, that is chemically resistant to the reducing agent. In the case exemplified hereinafter, associated to the body 70' are two compressible bodies 70 and 80, preferably having structures similar to those of the compressible bodies described with reference to FIGS. 1-19: for this purpose, the body 70' has both the aforesaid housing, for the body 70, and the aforesaid positioning element, for the body 80.

The positioning body 70' is traversed axially by a passage that, in its lower part (as viewed in FIG. 22) is shaped substantially like the portion of seat 62a described previously (see for reference FIG. 14) so as to receive within it the compressible body 70. On the other side, in its upper part (once again as viewed in FIG. 22), the positioning body 70 defines a hollow formation 78, provided with appendages 79 for positioning the compressible body 80.

Preferentially, and as emerges clearly from FIG. 22, the upper portion of the body 70' is substantially shaped so that also this defines a seat 75—with the corresponding peripheral wall 76 and bottom 77—and/or a seat 81, structurally similar to the ones already described above with reference to FIG. 11 and having similar functions (in this case, the seat 81 is delimited peripherally by a wall 81a of the body 70').

Figure 23:
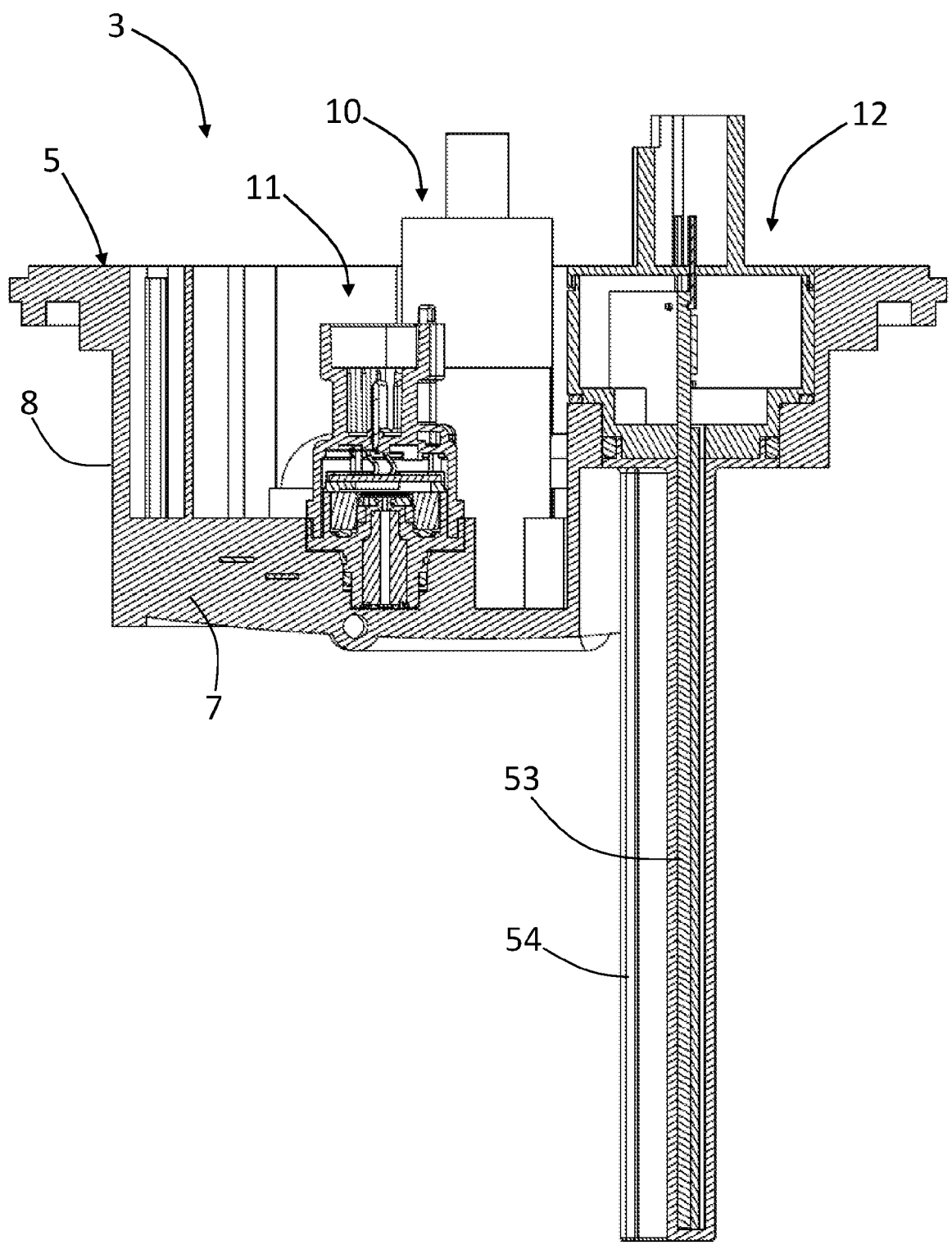
FIG. 23 is a schematic cross-sectional view of the tank component of FIG. 20, including the pressure sensor and the compensation insert of FIGS. 21 and 22.
Figure 24:
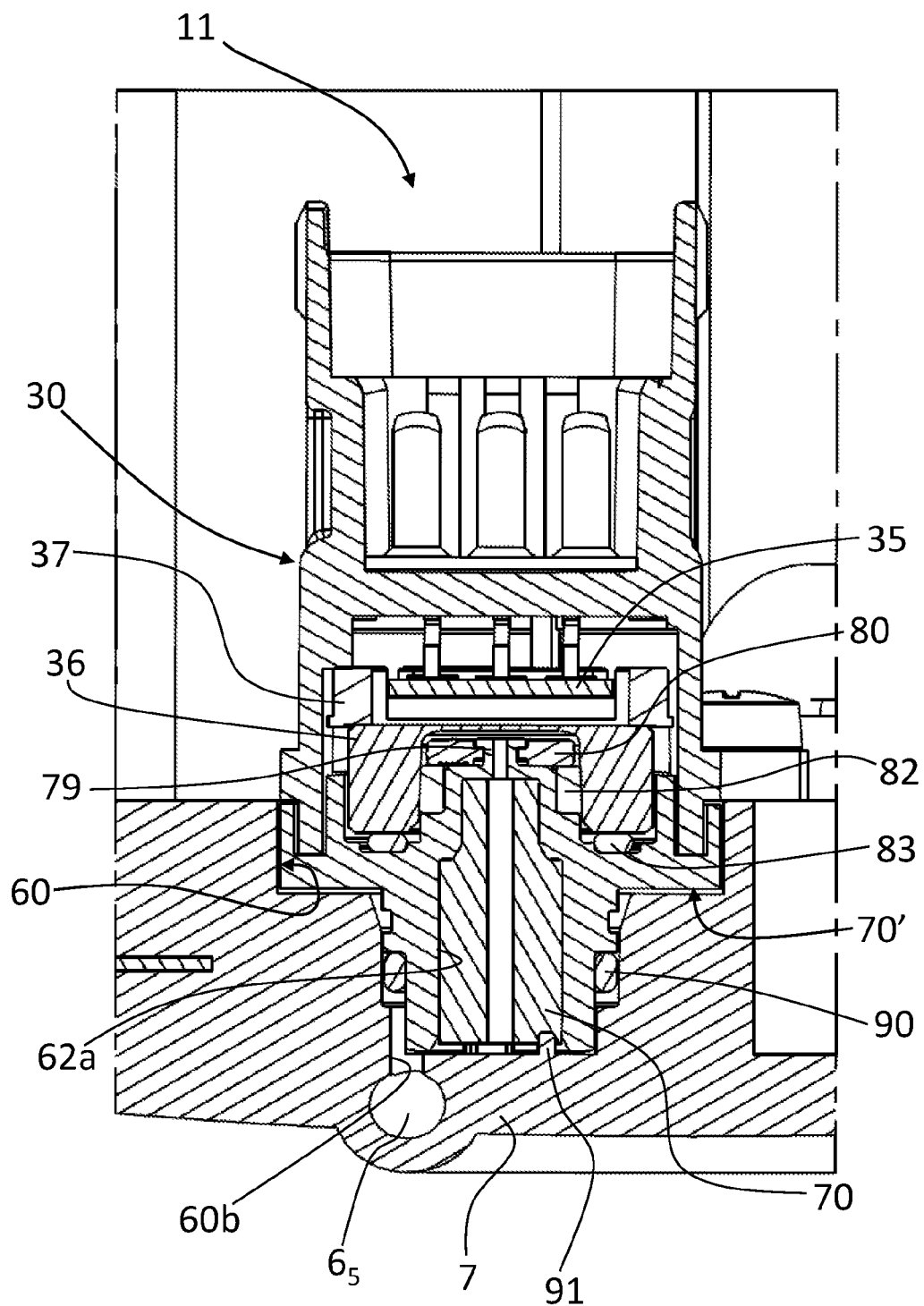
FIG. 24 is a detail at an enlarged scale of FIG. 23.

As may be appreciated from FIGS. 23 and 24, in this case, the compensation insert, including the positioning body 70' and at least one of the two compressible bodies 70 and 80, preferably both of them, is mounted in the seat 60, which here is defined at the outer side of the wall 7 of the body 5 of the tank component 3.

In embodiments of this type, the component 3 includes a pump of the type already designated by 10, and defined in its body is the corresponding passageway 6, preferably including at least one of the corresponding inlet $6_2$, for drawing off the reducing agent from the tank, and the corresponding outlet $6_1$, for injection thereof into the system 2 of FIG. 1. The configuration of the passageway 6 may be substantially similar to the one described with reference to FIGS. 13-16, but with the difference that, in this case, the delivery path—here designated by $6_5$—does not necessarily include two distinct stretches (designated by $6_4$ and $6_5$ in FIGS. 13-16) each connected to the seat 60.

Figure 25:
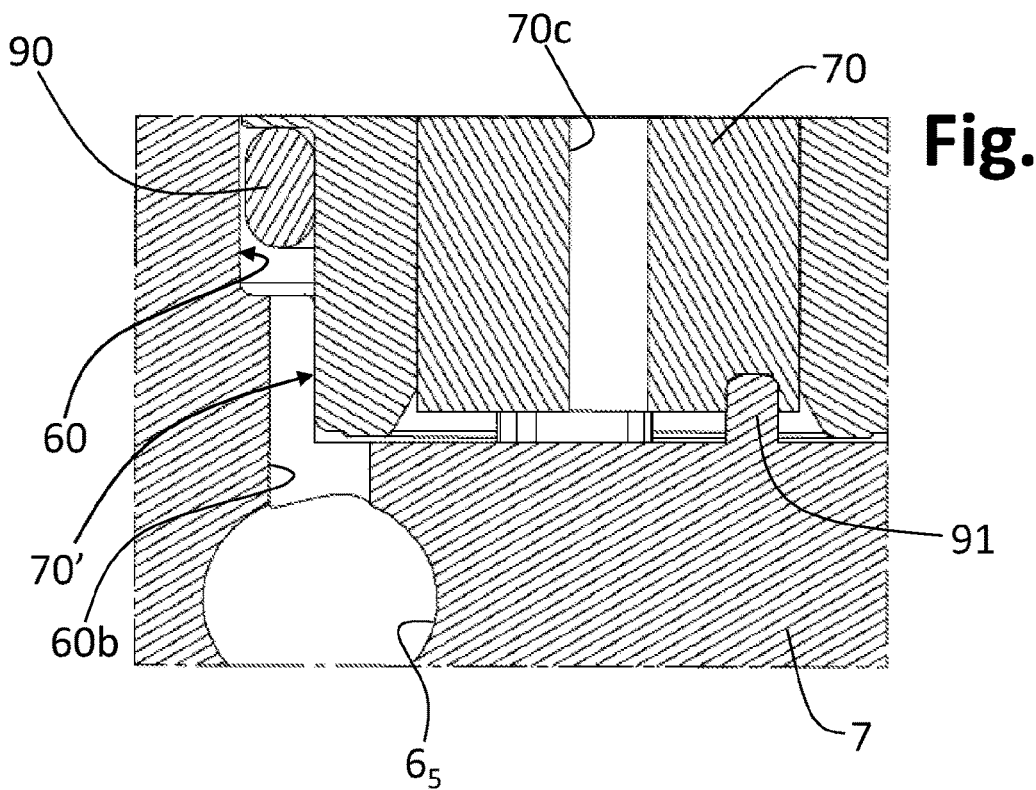
FIG. 25 is a detail at an enlarged scale of FIG. 24.
Figure 26:
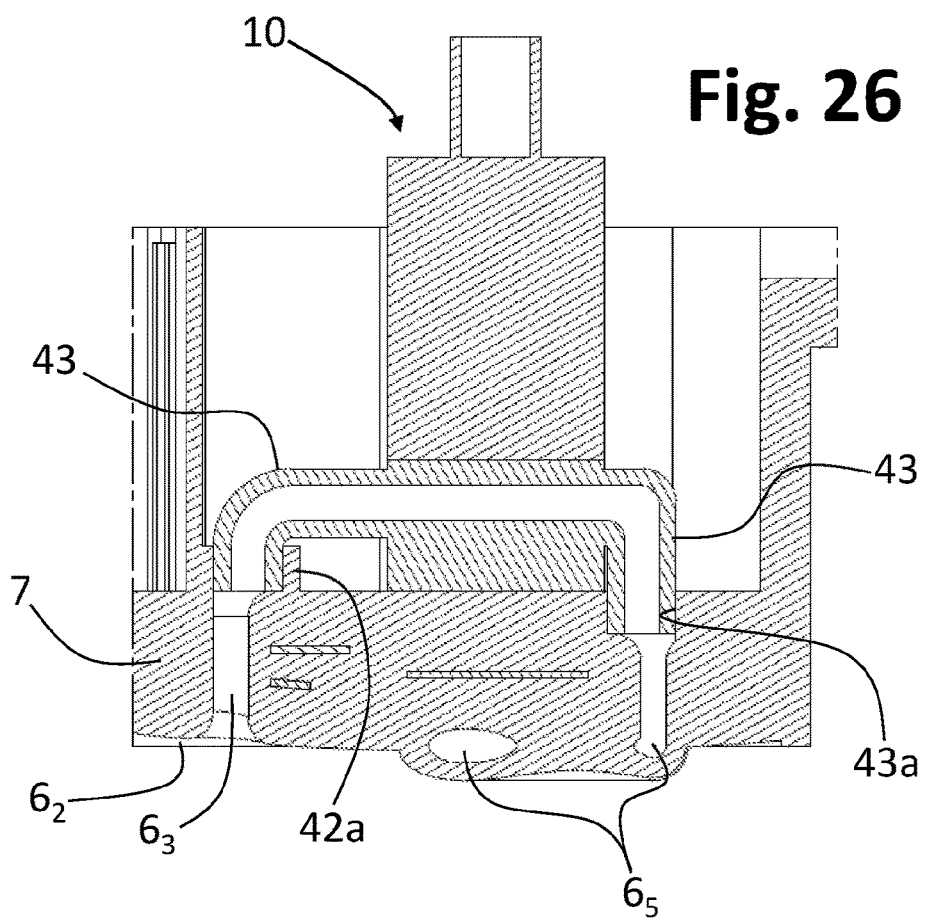
FIGS. 26 and 27 are partial and schematic cross-sectional views of the tank component of FIG. 20.
Figure 27:
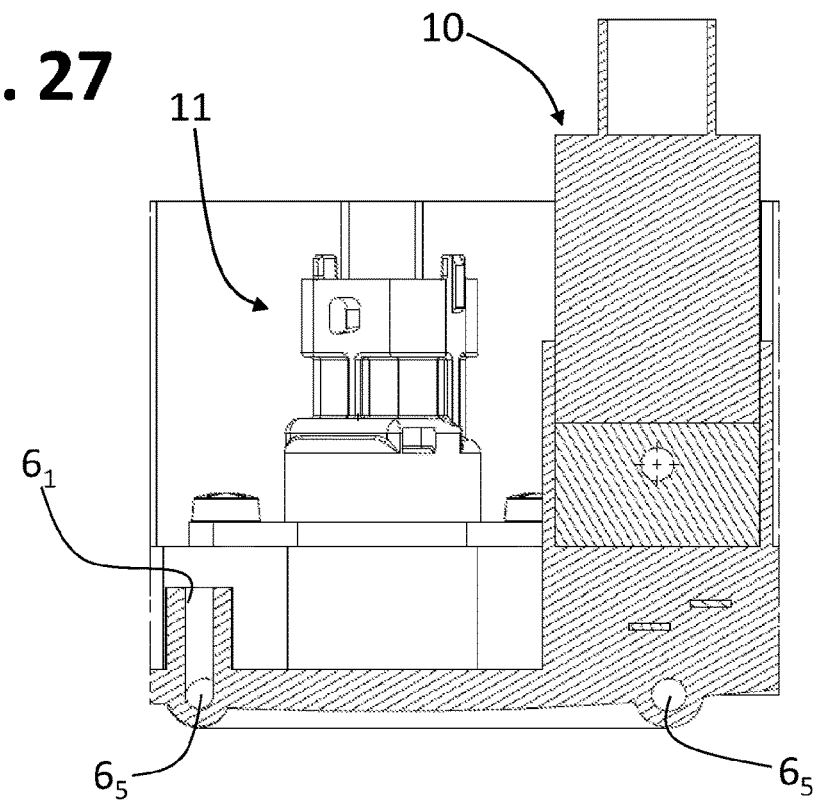

With reference in particular to FIGS. 24-25, the passageway defined in the wall 7 has a port 60b, instead of the delivery path $6_5$ in fluid communication with the seat 60. The body 70' of the compensation insert is in any case configured for enabling the liquid to reach the axial passage 70c of the compressible body 70 and, hence, the sensitive element of the sensor 11. It is moreover preferable for the bottom of the seat 60 to be provided with one or more reliefs 91, having functions similar to those of the reliefs 61d described with reference to FIG. 11, i.e., the function of keeping the end surface of the body 70 at least slightly raised with respect to the surface of the seat 60 departing from which is the passage 60a. Also in this case, additionally or as an alternative, reliefs having a similar function could be provided in the face of the body 70 facing the bottom of the seat 70.

Preferentially, arranged between the seat 60 and the outside of the positioning body 70' is at least one sealing element, such as an annular gasket 90. The gasket 90 may be mounted or overmoulded on one of the positioning bodies 70' and the body 5 of the component 3.

Once again with reference to FIGS. 23-24, mounted on the upper part of the compensation insert including the body 70' and the bodies 70 and 80 is the body 30 of the sensor 11, with modalities substantially similar to the ones already described previously with reference to the embodiments of FIGS. 1-16: the body 30 of the sensor can thus be secured to the outer side of the wall 7, for example, in a way similar to what has been described previously, exploiting the brackets 33 and the screws 57. In the assembled condition, the compensation insert (body 70' and bodies 70 and 80) is hence withheld in position in the passageway represented by the seat 60 via fixing of the body 30 to the wall 7. Thanks to the presence of the possible annular gasket 90, the body 70' is elastically mounted in a fluid-tight way in the corresponding seat 60.

It will be appreciated that, thanks to the presence of the sealing element 82 and/or of the elastic supporting element 83 (which can operate also as gasket), the reducing agent is confined between surfaces of the body 70' and surfaces of the sensitive element 36 (the sensing chamber referred to previously), without any possibility of contact with the casing body 30 of the sensor 11. This body 30 may thus possibly be made of a material not chemically resistant to the reducing agent.

It will moreover be appreciated that, in embodiments of this type, the compensation insert 70' may be in effect shaped as a part of the entire casing of the pressure sensor 11, which integrates one or more compressible bodies.

Figure 28:
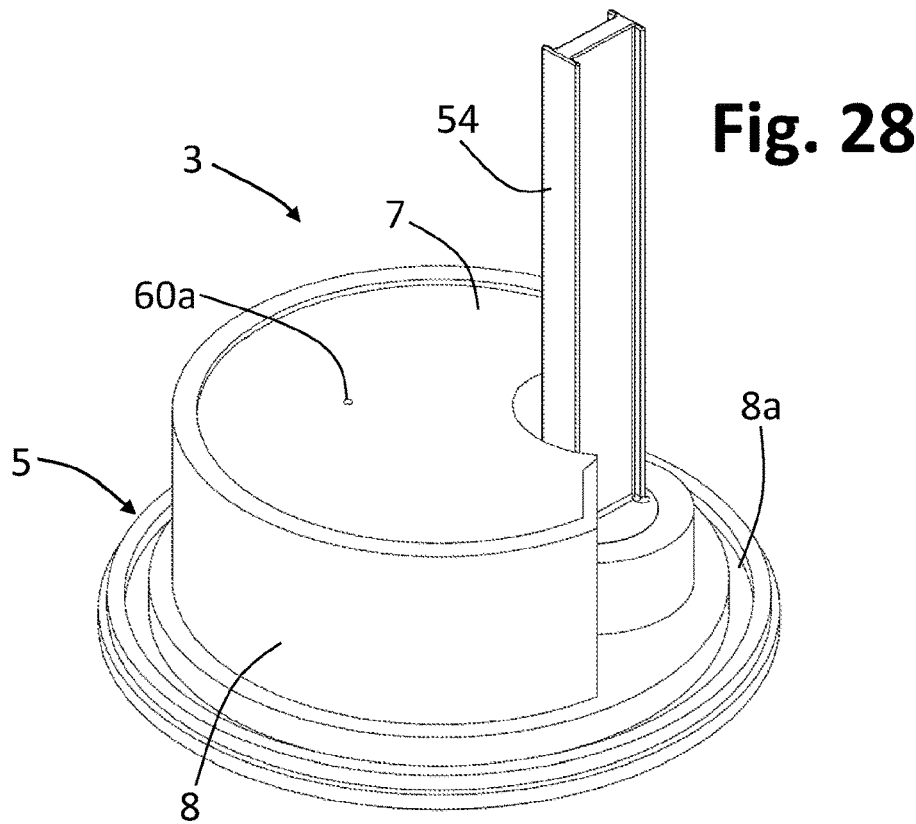
FIG. 28 is a schematic perspective view of a tank component according to a further embodiment of the invention.
Figure 29:
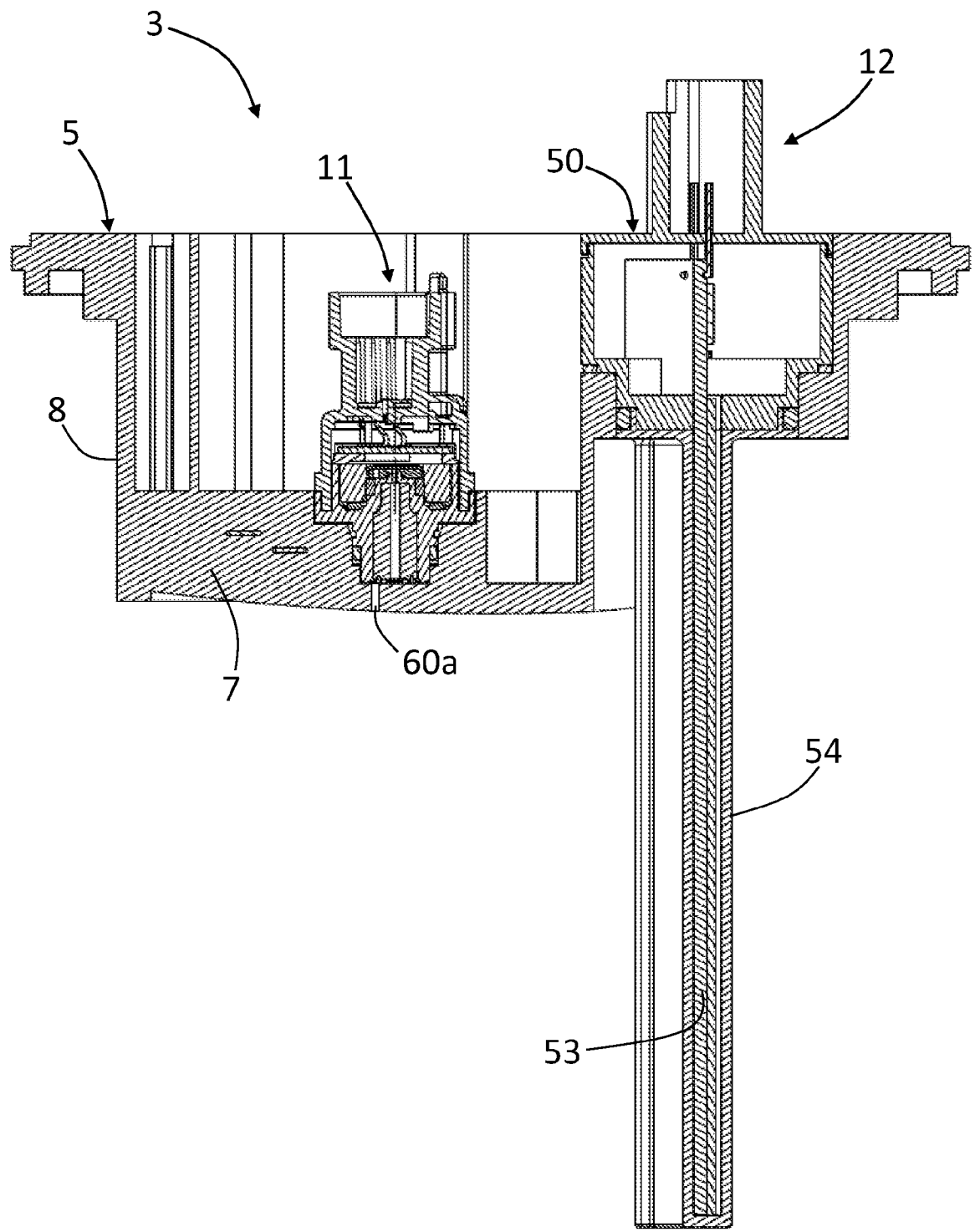
FIG. 29 is a schematic cross-sectional view of the tank component of FIG. 28, including a pressure sensor and a compensation insert of the type illustrated in FIGS. 21 and 22.
Figure 30:
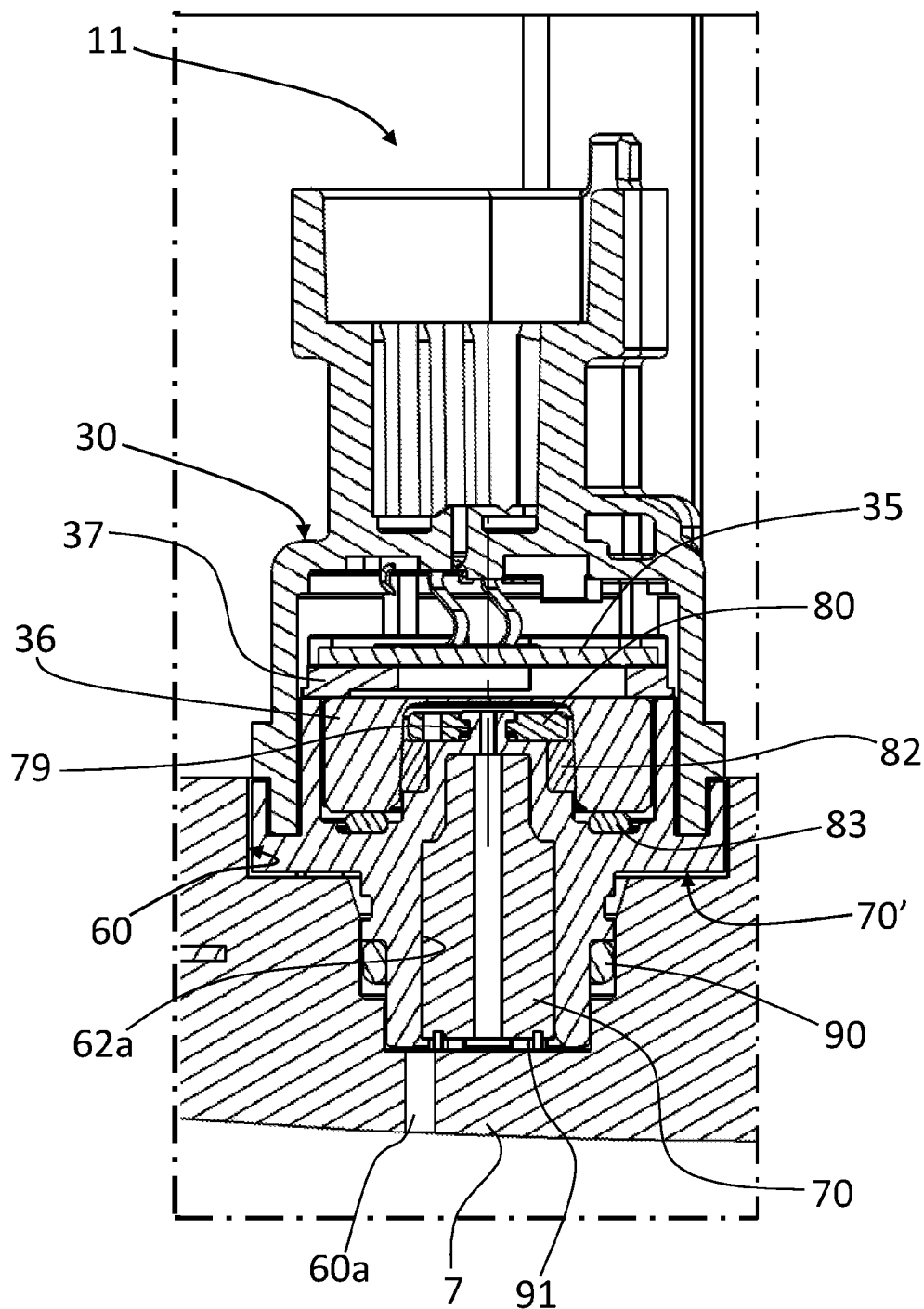
FIG. 30 is a detail at an enlarged scale of FIG. 29.

The version of component 3 appearing in FIGS. 28-30 is conceptually similar, as regards installation of the compensation insert (bodies 70', 70, and 80) to the one described with reference to FIGS. 20-27, and is hence distinguished by a positioning seat 60 housed in which is a positioning body 70' bearing at least one compressible body, preferably both of the compressible bodies 70 and 80. In these embodiments—and in a way similar to what is described with reference to FIGS. 17-19—the tank component 3 is not directly provided with a pump 8 (and hence with intake and delivery paths), and the sensor 11 is used for detecting the pressure of the reducing agent in the tank 1, in a way similar to what has already been described above. The component 3 comprises in any case a passageway for the reducing agent, used for the purposes of pressure sensing. On the other hand, as mentioned with reference to FIGS. 17-19, if need be, there could also be provided for the liquid a duct functionally similar to the passageway 6 described previously and/or a pump associated to respective intake and delivery ducts, independent of the passageway of the pressure sensor 11.

In this case, the seat 60 includes a passage 60a that opens on the inner side of the wall 7 so as to enable passage of the reducing agent. Also in this embodiment, it is preferable for the bottom of the seat 60 to be provided with one or more reliefs 91 for keeping the end of the body 70 and/or of the body 70' in a position at least slightly raised with respect to the bottom of the seat 60. Also in this case, in addition or as an alternative, reliefs having a similar function could be provided in the face of the body 70 facing the bottom of the seat 60. For the rest, construction of the component 3 and operation of the sensor 11 with the associated compensation insert are similar to what has been described previously with reference to FIGS. 1-16. Also in embodiments of this type, in effect, the insert including the body 70' may be shaped so as to provide part of the entire casing of the pressure sensor 11 (or other sensor).

The invention has been described with particular reference to use of at least one compensation insert in combination with a pressure sensor, but it is clear that it may be used also in combination with sensors or functional devices of some other type, in particular distinguished by the presence of delicate parts potentially subject to damage caused by the increase in volume of the reducing agent on account of freezing. For instance, embodiments similar to the ones described above may advantageously be used in combination with sensors for detecting the quality of the reducing agent, for example, sensors of an optical type. The invention finds useful applications also for reducing similar risks of damage to other functional devices that may be present in the tank component, for example, valves and flow regulators, not exemplified herein, or of the pump itself. In these applications, the housing seat for the compensation insert or inserts will be in fluid communication with corresponding passageways, via which the reducing agent comes into contact with these devices, or else integrated at least in part in the functional devices.

Advantageously, at least one from among the body 5, the tank component 3, and the functional devices is associated to at least one compensation element or body, preferably of the type at least in part compressible or deformable or variable, in particular to prevent damage and/or anomalies of operation in conditions of freezing of the liquid or additive; this compensation element or body is preferably mounted or overmoulded on the body of the component and/or on one of the functional elements associated to them.

Advantageously, at least one from among the body 5, the tank component 3, and the functional devices envisages at least one overmoulded sealing element, preferably made of a moulded polymer or elastomer, such as an elastic element operating as seal between the body 5 of the component 3 and at least one of the tank and the functional elements, such as at least one sensor and/or pump and/or heater and/or filter.

From the foregoing description, the characteristics of the present invention emerge clearly, as likewise its advantages.

The fact that at least partially defined in the body of the component, and in particular in at least one bottom wall thereof, are one or more ducts and/or hydraulic connections and/or one or more seats for positioning or housing functional elements and/or compensation elements simplifies and accelerates assembly of the component itself, increasing the reliability and the tightness thereof. The presence of at least one compensation insert within the tank component enables reduction of the risks of damage due to possible freezing of the reducing agent. The body of the tank component according to the invention is in any case simple to produce, can be obtained via a moulding operation, comprising one or more steps of moulding of plastic material, such as a thermoplastic polymer, or else a thermoplastic polymer and an elastomer, with which the aforesaid seats and/or compensation and/or sealing elements may be defined in the body itself.

Advantageously, moreover, via the same moulding operation, possibly in different steps, the heater may be integrated in the body of the component. Likewise simple to produce is the positioning body 70', when envisaged, which can be obtained via moulding of a plastic material resistant to the reducing agent.

Also the heater device previously described is simple to produce, in so far as it can be obtained via elementary operations of blanking and deformation of metal laminas and subsequent moulding of the electrically resistive material. The preferred conformation of the heater device, which enables prevalent integration thereof in the peripheral wall of the plastic body of the component, if present, ensures a diffused distribution of heat, when unfreezing of the content of the tank becomes necessary.

It is clear that numerous variations may be made by the person skilled in the art to the module described by way of example herein, without thereby departing from the scope of the invention as defined by the ensuing claims.

In the embodiments exemplified previously, the body 5 of the tank component 3 has a peripheral wall and a bottom wall formed integrally in a single piece. However, according to possible variant embodiments, the component in question includes the single peripheral wall 8, at least partially embedded in the plastic material of which is the heating device 3, and then associated in a fluid-tight way to the above component is a bottom wall, like the wall 7, prearranged for installation of one or more functional components, such as the pump and/or the sensors mentioned previously.

The shapes and/or the connections of the individual heating elements 13a could also be different and/or have an orientation different from the one exemplified, possibly being moulded apart and/or as independent elements, subsequently assembled and/or connected together and/or to a body 5 of the component 3.

The invention claimed is:

1. A component of a tank of a liquid, the tank component having a body designed to be positioned in a fluid-tight way at an opening of the tank, the tank component incorporating a plurality of functional devices for management of the liquid to be delivered from the tank,
    wherein the body of the tank component is a body moulded with a plastic material chemically resistant to the liquid and is provided with at least one passageway for the liquid;
    wherein the plurality of functional devices comprises a pump and a pressure sensor having a pressure-sensitive element;
    wherein the at least one passageway comprises a delivery path for the liquid, which is defined at least in part in a first wall of the body of the tank component and has an inlet end configured for connection to a delivery duct of the pump;
    wherein defined at an outer side of the first wall is at least one positioning seat for at least one part of the pressure sensor;
    wherein moreover defined in the first wall is at least one passage for setting the delivery path for the liquid in fluid communication with the pressure-sensitive element of the pressure sensor;
    wherein the pressure-sensitive element has a deformable membrane, and the at least one positioning seat comprises a first positioning seat for the pressure-sensitive element; and
    wherein set between a surface of the first positioning seat for the pressure-sensitive element and the pressure-sensitive element is at least one of a scaling element and an elastic supporting element.

2. The tank component according to claim 1, wherein the pressure sensor has a casing body, and the at least one positioning seat comprises a second positioning seat for an end portion of the casing body.

3. The tank component according to claim 1, wherein at least one from among a part of the body in contact with the liquid, a stretch of the passageway and the at least one passage defines a seat for a compensation insert that comprises at least one compressible body designed to be in contact with the liquid and configured for compensating possible volume variations thereof.

4. The tank component according to claim 3, wherein the seat for the compensation insert has two portions having different perimetral dimensions, for housing corresponding portions of the at least one compressible body.

5. The tank component according to claim 3, wherein the compensation insert comprises a positioning body made of a material that is substantially rigid and chemically resistant to the liquid, associated to which is the at least one compressible body.

6. The tank component according to claim 1, further comprising at least one compressible body, designed to be in contact with the liquid and configured for compensating possible volume variations thereof, which is mounted or moulded on a body of one of said plurality of functional devices.

7. The tank component according to claim 1, further comprising a heater device having at least one heating element, wherein the at least one heating element includes a first electrode, a second electrode, and a material having a PTC effect set at least in part between the first and second electrodes.

8. The tank component according to claim 7, wherein:
the first electrode is generally set parallel to and facing the second electrode;
the material having the PTC effect comprises a plastic-based or polymeric-based material overmoulded between facing surfaces of the first and second electrodes; and
at least a part of the body of the tank component is overmoulded at least in part on the at least one heating element.

9. The tank component according to claim 1, further comprising a level sensor, wherein the body of the tank component has an opening or a seat that is shaped so as to define at least one of:
at least part of a housing or of a casing for a sensing support of the level sensor; and
a positioning seat for a hollow body of the level sensor.

10. The tank component according to claim 9, wherein at said opening of the body of the tank component, and fixed in a fluid-tight way to the body of the tank component, is a casing for a sensing support of the level sensor, that projects axially from the corresponding hollow body.

11. The tank component according to claim 1, wherein defined in the first wall of the body of the tank component is at least one of an intake path and a delivery path of the liquid.

12. The tank component according to claim 11, wherein said intake path or said delivery path has an end shaped for providing a coupling seat for a respective intake duct or delivery duct, respectively, of a body of the pump.

13. The tank component according to claim 1,
wherein the plurality of functional devices comprises a first device having at least one delicate part potentially subject to damage caused by an increase in volume of the liquid due to a freezing thereof, the first device having a protection arrangement configured for compensating possible volume variations of the liquid and thereby preventing an ensuing damage to said at least one delicate part, the protection arrangement including at least one compressible body that is to come into contact with the liquid.

14. A system for treating exhaust gases of an internal-combustion engine, comprising a tank of a liquid reducing agent, said tank including the tank component according to claim 1.

15. A component of a tank of a liquid, the tank component having a body designed to be positioned in a fluid-tight way at an opening of the tank, the tank component incorporating a plurality of functional devices for management of the liquid to be delivered from the tank,
wherein the body of the tank component is a body moulded with a plastic material chemically resistant to the liquid and is provided with at least one passageway for the liquid;
wherein the plurality of functional devices comprises a pump and a pressure sensor having a pressure-sensitive element;
wherein the at least one passageway comprises a delivery path for the liquid, which is defined at least in part in a first wall of the body of the tank component and has an inlet end configured for connection to a delivery duct of the pump;
wherein defined at an outer side of the first wall is at least one positioning seat for at least one part of the pressure sensor;
wherein moreover defined in the first wall is at least one passage for setting the delivery path for the liquid in fluid communication with the pressure-sensitive element of the pressure sensor;
wherein at least one from among a part of the body in contact with the liquid, a stretch of the passageway and the at least one passage defines a seat for a compensation insert that comprises at least one compressible body designed to be in contact with the liquid and configured for compensating possible volume variations thereof;
wherein the pressure-sensitive element has a deformable membrane, and the at least one positioning seat comprises a first positioning seat for the pressure-sensitive element, and
wherein the seat for the compensation insert comprises a positioning element for supporting said at least one compressible body, the positioning element being defined at the first positioning seat for the pressure-sensitive element and being axially hollow for defining a corresponding portion of the at least one passage.

16. A component of a tank of a liquid, the tank component having a body designed to be positioned in a fluid-tight way at an opening of the tank, the tank component incorporating a plurality of functional devices for management of the liquid to be delivered from the tank,
wherein the body of the tank component is a body moulded with a plastic material chemically resistant to the liquid and is provided with at least one passageway for the liquid;
wherein the plurality of functional devices comprises a pump and a pressure sensor having a pressure-sensitive element;
wherein the at least one passageway comprises a delivery path for the liquid, which is defined at least in part in a first wall of the body of the tank component and has an inlet end configured for connection to a delivery duct of the pump;
wherein defined at an outer side of the first wall is at least one positioning seat for at least one part of the pressure sensor;
wherein moreover defined in the first wall is at least one passage for setting the delivery path for the liquid in fluid communication with the pressure-sensitive element of the pressure sensor;
wherein at least one from among a part of the body in contact with the liquid, a stretch of the passageway and the at least one passage defines a seat for a compensation insert that comprises at least one compressible body designed to be in contact with the liquid and configured for compensating possible volume variations thereof,
wherein the seat for the compensation insert opens at an inner side of the first wall and is shaped for receiving one of said at least one compressible body with a corresponding retention element.

17. A component of a tank of a liquid, the tank component having a body designed to be positioned in a fluid-tight way at an opening of the tank, the tank component incorporating a plurality of functional devices for management of the liquid to be delivered from the tank, wherein the body of the tank component is a body moulded with a plastic material chemically resistant to the liquid and is provided with at least one passageway for the liquid;

wherein the plurality of functional devices comprises a pump and a pressure sensor having a pressure-sensitive element;

wherein the at least one passageway comprises a delivery path for the liquid, which is defined at least in part in a first wall of the body of the tank component and has an inlet end configured for connection to a delivery duct of the pump;

wherein defined at an outer side of the first wall is at least one positioning seat for at least one part of the pressure sensor;

wherein moreover defined in the first wall is at least one passage for setting the delivery path for the liquid in fluid communication with the pressure-sensitive element of the pressure sensor;

wherein at least one from among a part of the body in contact with the liquid, a stretch of the passageway and the at least one passage defines a seat for a compensation insert that comprises at least one compressible body designed to be in contact with the liquid and configured for compensating possible volume variations thereof;

wherein the compensation insert comprises a positioning body made of a material that is substantially rigid and chemically resistant to the liquid, associated to which is the at least one compressible body;

wherein the positioning body defines at least one from among:
  a housing for receiving within it one of the at least one compressible body,
  a positioning element for supporting on its outside one of the at least one compressible body,
  a sensor positioning seat for the pressure-sensitive element, in an end portion of the positioning body,
  a casing positioning seat for an end portion of the casing body of the pressure sensor, in an end portion of the positioning body.

* * * * *